US012628240B2

(12) United States Patent (10) Patent No.: US 12,628,240 B2
Wang et al. (45) Date of Patent: May 12, 2026

(54) INFORMATION DETERMINATION METHOD, DEVICE, APPARATUS AND COMPUTER READABLE STORAGE MEDIUM

(71) Applicant: DATANG MOBILE COMMUNICATIONS EQUIPMENT CO., LTD., Beijing (CN)

(72) Inventors: Da Wang, Beijing (CN); Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 488 days.

(21) Appl. No.: 17/792,111

(22) PCT Filed: Dec. 28, 2020

(86) PCT No.: PCT/CN2020/139949
§ 371 (c)(1),
(2) Date: Jul. 11, 2022

(87) PCT Pub. No.: WO2021/143499
PCT Pub. Date: Jul. 22, 2021

(65) Prior Publication Data
US 2023/0056525 A1 Feb. 23, 2023

(30) Foreign Application Priority Data

Jan. 15, 2020 (CN) .......................... 202010044963.7

(51) Int. Cl.
*H04W 76/28* (2018.01)
*H04W 76/27* (2018.01)
(Continued)

(52) U.S. Cl.
CPC ........... *H04W 76/28* (2018.02); *H04W 76/27* (2018.02); *H04W 28/0231* (2013.01); *H04W 52/0216* (2013.01)

(58) Field of Classification Search
CPC ..... H04W 76/28; H04W 76/27; H04W 76/14; H04W 72/12; H04W 76/10; H04W 52/0216; H04W 28/0231
(Continued)

(56) References Cited

U.S. PATENT DOCUMENTS 11,438,842 B2 * 9/2022 Zhao ...................... H04W 76/10
2017/0339682 A1 * 11/2017 Lee .......................... H04L 1/188
(Continued)

FOREIGN PATENT DOCUMENTS

CN 102196540 A 9/2011
CN 107211362 A 9/2017
(Continued)

OTHER PUBLICATIONS

The Extended European Search Report for the corresponding European Patent Application No. 20913394.1 issued by the European Patent Office on Jun. 2, 2023.
(Continued)

*Primary Examiner* — Jungwon Chang
(74) *Attorney, Agent, or Firm* — Ladas & Parry, LLP

(57) ABSTRACT

Embodiments of the present disclosure provide an information determination method, apparatus, device, and computer-readable storage medium. The method includes: obtaining a sidelink channel measurement result, and determining a timer length of a target DRX timer according to the sidelink channel measurement result; or receiving indication information from a second terminal and determining the timer length of the target DRX timer according the indication information from the second terminal; the indication (Continued)

information being used to indicate the timer length of the target DRX timer; wherein the first terminal communicates with the second terminal through a sidelink.

14 Claims, 6 Drawing Sheets

(51) Int. Cl.
　　*H04W 28/02*　　　(2009.01)
　　*H04W 52/02*　　　(2009.01)
(58) Field of Classification Search
　　USPC .......................................................... 370/329
　　See application file for complete search history.

(56) References Cited

U.S. PATENT DOCUMENTS

| | | | | |
|---|---|---|---|---|
| 2018/0014347 A1* | 1/2018 | Nagasaka | ............... | H04W 8/22 |
| 2018/0198572 A1 | 7/2018 | Wang et al. | | |
| 2018/0220366 A1 | 8/2018 | Bergström et al. | | |
| 2019/0053305 A1 | 2/2019 | Saiwai et al. | | |
| 2019/0090198 A1* | 3/2019 | Zhao | ..................... | H04W 76/14 |
| 2019/0098689 A1* | 3/2019 | Wei | ....................... | H04W 76/28 |
| 2019/0174411 A1 | 6/2019 | Xu et al. | | |
| 2019/0208538 A1* | 7/2019 | Lee | ....................... | H04W 76/28 |
| 2019/0215896 A1 | 7/2019 | Zhou et al. | | |
| 2019/0254050 A1 | 8/2019 | Kusashima et al. | | |
| 2020/0092936 A1 | 3/2020 | Yang | | |
| 2020/0245395 A1* | 7/2020 | Zhang | .................. | H04L 5/0053 |
| 2022/0174781 A1* | 6/2022 | Yang | ..................... | H04W 76/28 |
| 2022/0183103 A1* | 6/2022 | Bao | ....................... | H04W 72/12 |
| 2023/0337140 A1* | 10/2023 | Miao | ..................... | H04L 5/0053 |

FOREIGN PATENT DOCUMENTS

| | | | |
|---|---|---|---|
| CN | 107241786 A | | 10/2017 |
| CN | 108307489 A | | 7/2018 |
| CN | 109155970 A | | 1/2019 |
| CN | 109246659 A | | 1/2019 |
| CN | 109511157 A | | 3/2019 |
| CN | 109756967 A | | 5/2019 |
| CN | 110089159 A | | 8/2019 |
| WO | WO 2017/166961 | * | 5/2017 |

OTHER PUBLICATIONS

International Search Report for PCT Application PCT/CN2020/139949 , issued on Mar. 29, 2021 and its English Translation provided by WIPO.

Written Opinion for PCT Application PCT/CN2020/139949 , issued on Mar. 29, 2021, and its English Translation provided by WIPO.

International Preliminary Report on Patentability for PCT Application PCT/CN2020/139949, issued on Jul. 5, 2022, and its English Translation provided by WIPO.

"Clarification on PDCCH monitoring during DRX mode" 3GPP TSG-RAN2 Meeting #101 R2-1803681, NTT Docomo, Inc., Fujitsu, NEC, R2, Athens, Greece, Feb. 26-Mar. 2, 2018.

First Chinese Office Action for Chinese Patent Application 202010044963.7 issued by the Chinese Patent Office on Nov. 24, 2021 and its English Translation prvoided by Global Dossier.

* cited by examiner

INFORMATION DETERMINATION METHOD, DEVICE, APPARATUS AND COMPUTER READABLE STORAGE MEDIUM

CROSS-REFERENCE TO RELATED APPLICATIONS

This application is the U.S. national phase of PCT Application No. PCT/CN2020/139949 filed on Dec. 28, 2020, which claims priority to the Chinese patent application No. 202010044963.7 filed on Jan. 15, 2020, the disclosures of which are incorporated herein by reference in their entireties.

TECHNICAL FIELD

The present disclosure relates to the field of communications technology, in particular to an information determination method, device, apparatus and a computer readable storage medium.

BACKGROUND

Vehicle-to-everything (V2X) technology uses wireless communication between vehicles, vehicles and roadside infrastructure, and vehicles and pedestrian to sense the surrounding conditions of vehicles in real time, share road information, and provide timely warnings, it has become a research hotspot to solve road safety problems.

In the Long Term Evolution (LTE) V2X technology in the related art, broadcast communications on a PC5 interface (also called a sidelink in the protocol) for data transmission between UE (UE) and UE can already support the transmission of basic services based on the road safety. V2X services include vehicle-to-vehicle (V2V), vehicle-to-infrastructure (V2I), and vehicle-to-pedestrian (V2P) communications.

With the further development of the Internet of Vehicles technology, compared with LTE V2X at this stage, New Radio (NR) V2X has emerged some new application scenarios, such as: vehicle formation, advanced driving, sensor information sharing, and remote control and other applications, and unicast, multicast and broadcast services are supported at the same time. There is no discontinuous reception (DRX) mechanism in NR V2X in the related art. Therefore, there is a need to design a solution that saves the power consumption of the terminal and does not reduce the communication reliability of the terminal.

SUMMARY

Embodiments of the present disclosure provide an information determination method, device, apparatus and a computer readable storage medium, so as to save the power consumption of the terminal and not reduce the communication reliability of the terminal.

In a first aspect, an embodiment of the present disclosure provide an information determination method, applied to a first terminal, including: obtaining a sidelink channel measurement result, and determining a timer length of a target discontinuous reception (DRX) timer according to the sidelink channel measurement result; or receiving indication information from a second terminal and determining the timer length of the target DRX timer according the indication information from the second terminal; the indication information being used to indicate the timer length of the target DRX timer; wherein the first terminal communicates with the second terminal through a sidelink.

In some embodiments, the receiving the indication information from a second terminal includes: receiving a sidelink radio resource control (RRC) signaling or a sidelink media access control (MAC) control element (CE) sent by the second terminal, the sidelink RRC signaling or the sidelink MAC CE being used to indicate the timer length of the target DRX timer.

In some embodiments, the obtaining a sidelink channel measurement result includes at least one of the following: obtaining a sidelink channel measurement result of the first terminal; obtaining a sidelink channel measurement result sent by the second terminal; or obtaining a sidelink channel measurement result sent by a network side device.

In some embodiments, the obtaining a sidelink channel measurement result sent by the second terminal includes: receiving a sidelink RRC signaling or a sidelink MAC CE sent by the second terminal, the sidelink RRC signaling or the sidelink MAC CE including the sidelink channel measurement result.

In some embodiments, the sidelink RRC signaling or the sidelink MAC CE further includes at least one of the following: a source layer L2 identifier, a destination L2 identifier, a sidelink radio barrier (SLRB) identifier, or a logic channel ID (LCID).

In some embodiments, the obtaining a sidelink channel measurement result sent by the network side device includes: obtaining an RRC signaling or a MAC CE sent by the network side device, wherein the RRC signaling or the MAC CE includes the sidelink channel measurement result.

In some embodiments, the RRC signaling or the MAC CE further includes at least one of the following: a source layer L2 identifier, a destination L2 identifier, an SLRB identifier, or an LCID.

In some embodiments, the determining the timer length of the target DRX timer according to the sidelink channel measurement result includes: obtaining a corresponding relationship between the sidelink channel measurement result and the timer length of the DRX timer; determining the timer length of the target DRX timer according the corresponding relationship and the sidelink channel measurement result.

In some embodiments, the determining the timer length of the target DRX timer according to the sidelink channel measurement result includes: obtaining a corresponding relationship among the sidelink channel measurement result, quality of service (QoS) and the timer length of the DRX timer; and determining the timer length of the target DRX timer according to the corresponding relationship, QoS required by a current service and the sidelink channel measurement result.

In some embodiments, the corresponding relationship is configured by the network side device, or the corresponding relationship is pre-configured in the first terminal.

In some embodiments, the corresponding relationship is configured by the network side device through a dedicated RRC signaling or a broadcast RRC signaling.

In some embodiments, the sidelink channel measurement result includes one or more of channel state information and a channel congestion degree; the channel state information includes one or more of the following: Channel State Information (CSI), Rand Indication (RI), Channel Quality Indicator (CQI), Signal to Interference plus Noise Ratio (SINR), Reference Signal Receiving Power (RSRP), Reference Signal Receiving Quality (RSRQ), Received Signal Strength Indication (RSSI), Block Error Rate, Bit Error Rate, and Sounding Reference Signal (SRS); the channel congestion degree includes one or more of the following: a Channel Busy Ratio (CBR) threshold, and a channel occupancy ratio (CR).

In some embodiments, the target DRX timer includes one or more of the following: Onduration timer, Short DRX cycle Timer, Long DRX cycle Timer, Inactivity Timer, RTT Timer, Retransmission Timer.

In a second aspect, an embodiment of the present disclosure provides an information determination method, applied to a second terminal, including: sending a sidelink channel measurement result to a first terminal, so that the first terminal determines a timer length of a target DRX timer according to the sidelink channel measurement result; or sending indication information to the first terminal, wherein the indication information is used to indicate the timer length of the target DRX timer; or sending a reference signal to the first terminal, so that the first terminal determines the sidelink channel measurement result according to the reference signal, and determine the timer length of the target DRX timer according to the sidelink channel measurement result; wherein the second terminal communicates with the first terminal through a sidelink.

In some embodiments, the sending a sidelink channel measurement result to a first terminal includes: sending a sidelink RRC signaling or a sidelink MAC CE to the first terminal, the sidelink RRC signaling or the sidelink MAC CE including the sidelink channel measurement result.

In some embodiments, the sending indication information to the first terminal includes: obtaining a corresponding relationship between the sidelink channel measurement result and the timer length of the DRX timer; determining the timer length of the target DRX timer according to the corresponding relationship and the sidelink channel measurement result; sending the indication information to the first terminal, wherein the indication information is used to indicate the timer length of the target DRX timer.

In some embodiments, the sending indication information to the first terminal includes: obtaining a corresponding relationship among the sidelink channel measurement result, QoS and the timer length of the DRX timer; determining the timer length of the target DRX timer according the corresponding relationship, QoS required by a current service and the sidelink channel measurement result; sending the indication information to the first terminal, wherein the indication information is used to indicate the timer length of the target DRX timer.

In some embodiments, the sending indication information to the first terminal includes: sending a sidelink RRC signaling or a sidelink MAC CE to the first terminal, wherein the sidelink RRC signaling or the sidelink MAC CE is used to indicate the timer length of the target DRX timer.

In some embodiments, the sidelink RRC signaling or the sidelink MAC CE further includes at least one of the following: a source layer L2 identifier, a destination L2 identifier, an SLRB identifier, or an LCID.

In some embodiments, the corresponding relationship is configured by the network side device, or the corresponding relationship is pre-configured in the second terminal.

In some embodiments, the corresponding relationship is configured by the network side device through a dedicated RRC signaling or a broadcast RRC signaling.

In some embodiments, the sidelink channel measurement result includes one or both of channel state information and a channel congestion degree; the channel state information includes one or more of the following: CSI, RI, CQI, SINR, RSRP, RSRQ, RSSI, block error rate, bit error rate and SRS;

the channel congestion degree includes one or more of the following: a CBR threshold, a CR.

In some embodiments, the target DRX timer includes one or more of the following: Onduration timer, Short DRX cycle Timer, Long DRX cycle Timer, Inactivity Timer, RTT Timer, Retransmission Timer.

In a third aspect, an embodiment of the present disclosure provides an information determination method, applied to a network side device, including: sending a sidelink channel measurement result to a first terminal, so that the first terminal determines a timer length of a target DRX timer according to the sidelink channel measurement result.

In some embodiments, the method further includes at least one of the following: sending a corresponding relationship between the sidelink channel measurement result and the timer length of the DRX timer to the first terminal and/or a second terminal; sending a corresponding relationship among the sidelink channel measurement result, QoS and the timer length of the DRX timer to the first terminal and/or the second terminal.

In a fourth aspect, an embodiment of the present disclosure provides an information determination device, applied to a first terminal, including: a first obtaining module, configured to obtain a sidelink channel measurement result, and determining a timer length of a target discontinuous reception (DRX) timer according to the sidelink channel measurement result; or a first receiving module, configured to receive indication information from a second terminal and determining the timer length of the target DRX timer according the indication information from the second terminal; the indication information being used to indicate the timer length of the target DRX timer; wherein the first terminal communicates with the second terminal through a sidelink.

In some embodiments, the first receiving module is specifically configured to receive a sidelink radio resource control (RRC) signaling or a sidelink media access control (MAC) control element (CE) sent by the second terminal, the sidelink RRC signaling or the sidelink MAC CE being used to indicate the timer length of the target DRX timer.

In some embodiments, the first obtaining module is specifically configured to execute at least one of the following: obtaining a sidelink channel measurement result of the first terminal; obtaining a sidelink channel measurement result sent by the second terminal; or obtaining a sidelink channel measurement result sent by a network side device.

In some embodiments, the first obtaining module is specifically configured to receive a sidelink RRC signaling or a sidelink MAC CE sent by the second terminal, the sidelink RRC signaling or the sidelink MAC CE including the sidelink channel measurement result; or, the first obtaining module is specifically configured to obtain an RRC signaling or a MAC CE sent by the network side device, wherein the RRC signaling or the MAC CE includes the sidelink channel measurement result.

In some embodiments, the first obtaining module includes: a first obtaining sub-module, configured to obtain a corresponding relationship between the sidelink channel measurement result and the timer length of the DRX timer; a first determination sub-module, configured to determine the timer length of the target DRX timer according the corresponding relationship and the sidelink channel measurement result; or, the first obtaining module includes: a second obtaining submodule, configured to obtain a corresponding relationship among the sidelink channel measurement result, quality of service (QoS) and the timer length of the DRX timer; a second determination submodule, configured to determine the timer length of the target DRX timer according to the corresponding relationship, QoS required by a current service and the sidelink channel measurement result.

In a fifth aspect, an embodiment of the present disclosure provides an information determination device, applied to a second terminal, including: a first sending module, configured to send a sidelink channel measurement result to a first terminal, so that the first terminal determines a timer length of a target DRX timer according to the sidelink channel measurement result; or a second sending module, configured to send indication information to the first terminal, wherein the indication information is used to indicate the timer length of the target DRX timer; or a third sending module, configured to send a reference signal to the first terminal, so that the first terminal determines the sidelink channel measurement result according to the reference signal, and determine the timer length of the target DRX timer according to the sidelink channel measurement result; wherein the second terminal communicates with the first terminal through a sidelink.

In some embodiments, the first sending module is specifically configured to send a sidelink RRC signaling or a sidelink MAC CE to the first terminal, the sidelink RRC signaling or the sidelink MAC CE including the sidelink channel measurement result.

In some embodiments, the second sending module includes: a first obtaining sub-module, configured to obtain a corresponding relationship between the sidelink channel measurement result and the timer length of the DRX timer; a first determination sub-module, configured to determine the timer length of the target DRX timer according to the corresponding relationship and the sidelink channel measurement result; a first sending submodule, configured to send the indication information to the first terminal, wherein the indication information is used to indicate the timer length of the target DRX timer; or, the second sending module includes: a second obtaining submodule, configured to obtain a corresponding relationship among the sidelink channel measurement result, QoS and the timer length of the DRX timer; a second determination submodule, configured to determine the timer length of the target DRX timer according the corresponding relationship, QoS required by a current service and the sidelink channel measurement result; and a second sending submodule, configured to send the indication information to the first terminal, wherein the indication information is used to indicate the timer length of the target DRX timer.

In a sixth aspect, an embodiment of the present disclosure provides an information determination device, applied to a network side device, including: a first sending module, configured to send a sidelink channel measurement result to a first terminal, so that the first terminal determines a timer length of a target DRX timer according to the sidelink channel measurement result.

In some embodiments, the information determination device further includes any one or both of the following modules: a second sending module, configured to send a corresponding relationship between the sidelink channel measurement result and the timer length of the DRX timer to the first terminal and/or a second terminal; a third sending module, configured to send a corresponding relationship among the sidelink channel measurement result, QoS and the timer length of the DRX timer to the first terminal and/or the second terminal.

In a seventh aspect, an embodiment of the present disclosure provides a communication apparatus, applied to a first terminal, including: a transceiver, a memory, a processor, and a program stored in the memory and executable on the processor; wherein the processor is configured to read the program in the memory to perform the following processes: obtaining a sidelink channel measurement result, and determining a timer length of a target discontinuous reception (DRX) timer according to the sidelink channel measurement result; or receiving indication information from a second terminal and determining the timer length of the target DRX timer according the indication information from the second terminal; the indication information being used to indicate the timer length of the target DRX timer; wherein the first terminal communicates with the second terminal through a sidelink.

In some embodiments, the processor is further configured to read the program in the memory to perform the following processes: receiving a sidelink radio resource control (RRC) signaling or a sidelink media access control (MAC) control element (CE) sent by the second terminal, the sidelink RRC signaling or the sidelink MAC CE being used to indicate the timer length of the target DRX timer.

In some embodiments, the processor is further configured to read the program in the memory to perform the following processes: obtaining a sidelink channel measurement result of the first terminal; obtaining a sidelink channel measurement result sent by the second terminal; or obtaining a sidelink channel measurement result sent by a network side device.

In some embodiments, the processor is further configured to read the program in the memory to perform the following processes: receiving a sidelink RRC signaling or a sidelink MAC CE sent by the second terminal, the sidelink RRC signaling or the sidelink MAC CE including the sidelink channel measurement result; or obtaining an RRC signaling or a MAC CE sent by the network side device, wherein the RRC signaling or the MAC CE includes the sidelink channel measurement result.

In some embodiments, the processor is further configured to read the program in the memory to perform the following processes: obtaining a corresponding relationship between the sidelink channel measurement result and the timer length of the DRX timer; determining the timer length of the target DRX timer according the corresponding relationship and the sidelink channel measurement result; or obtaining a corresponding relationship among the sidelink channel measurement result, quality of service (QoS) and the timer length of the DRX timer; and determining the timer length of the target DRX timer according to the corresponding relationship, QoS required by a current service and the sidelink channel measurement result.

In an eighth aspect, an embodiment of the present disclosure provides a communication apparatus, applied to a second terminal, including: a transceiver, a memory, a processor, and a program stored on the memory and executed by the processor; wherein the processor is configured to read the program in the memory to perform the following processes: sending a sidelink channel measurement result to a first terminal, so that the first terminal determines a timer length of a target DRX timer according to the sidelink channel measurement result; or sending indication information to the first terminal, wherein the indication information is used to indicate the timer length of the target DRX timer; or sending a reference signal to the first terminal, so that the first terminal determines the sidelink channel measurement result according to the reference signal, and determine the timer length of the target DRX timer according to the sidelink channel measurement result; wherein the second terminal communicates with the first terminal through a sidelink.

In some embodiments, the processor is further configured to read the program in the memory to perform the following processes: sending a sidelink RRC signaling or a sidelink MAC CE to the first terminal, the sidelink RRC signaling or the sidelink MAC CE including the sidelink channel measurement result.

In some embodiments, the processor is further configured to read the program in the memory to perform the following processes: obtaining a corresponding relationship between the sidelink channel measurement result and the timer length of the DRX timer; determining the timer length of the target DRX timer according to the corresponding relationship and the sidelink channel measurement result; sending the indication information to the first terminal, wherein the indication information is used to indicate the timer length of the target DRX timer; or obtaining a corresponding relationship among the sidelink channel measurement result, QoS and the timer length of the DRX timer; determining the timer length of the target DRX timer according the corresponding relationship, QoS required by a current service and the sidelink channel measurement result; sending the indication information to the first terminal, wherein the indication information is used to indicate the timer length of the target DRX timer.

In a ninth aspect, an embodiment of the present disclosure provides a communication apparatus, applied to a network side device, including: a transceiver, a memory, a processor, and a program stored in the memory and executed by the processor; wherein the processor is configured to read the program in memory to perform the following processes: sending a sidelink channel measurement result to a first terminal, so that the first terminal determines a timer length of a target DRX timer according to the sidelink channel measurement result.

In some embodiments, the processor is further configured to read the program in the memory to perform at least one of the following: sending a corresponding relationship between the sidelink channel measurement result and the timer length of the DRX timer to the first terminal and/or a second terminal; sending a corresponding relationship among the sidelink channel measurement result, QoS and the timer length of the DRX timer to the first terminal and/or the second terminal.

In a tenth aspect, an embodiment of the present disclosure provides a computer-readable storage medium for storing a computer program, wherein the computer program is executed by a processor to implement the steps in the information determination method.

In the embodiment of the present disclosure, the first terminal may determine the timer length of the target DRX timer according to the sidelink channel measurement result or the indication information of the second terminal, so that the power consumption of the first terminal can be saved, and the communication reliability of the first terminal is not reduced.

BRIEF DESCRIPTION OF THE DRAWINGS

In order to illustrate the technical solutions of the embodiments of the present disclosure more clearly, the following briefly introduces the accompanying drawings used in the description of the embodiments of the present disclosure. Obviously, the accompanying drawings in the following description are only some embodiments of the present disclosure. For those of ordinary skill in the art, other drawings can also be obtained from these drawings without creative work.

DETAILED DESCRIPTION

The technical solutions in the embodiments of the present disclosure will be clearly and completely described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative efforts shall fall within the protection scope of the present disclosure.

Hereinafter, some terms in the embodiments of the present disclosure will be explained to facilitate understanding.

(1) A network side device is a device that provides wireless communication functions for the terminal, including but not limited to: gNB, radio network controller (RNC), node B (NB), base station controller (BSC), base transceiver station (BTS), home base station (for example, home evolved node B, or home node B, HNB), baseband unit (BBU), Transmitting and receiving point (TRP), transmitting point (TP), mobile switching center in 5G, etc. The base station in the present disclosure may also be a device that provides wireless communication functions for the terminal in other communication systems that may appear in the future.

(2) User Equipment (UE) is a device that can provide voice and/or data connectivity to users. For example, the terminal device includes a handheld device with a wireless connection function, a vehicle-mounted device, and the like. In the related art, the terminal device may be: a mobile phone, a tablet computer, a notebook computer, a palmtop computer, a mobile internet device (MID), a wearable device, a virtual reality (VR) device, an augmented reality (AR) equipment, wireless terminals in industrial control, wireless terminals in self-driving, wireless terminals in smart grid, wireless terminals in transportation safety, wireless terminals in a smart city, or wireless terminals in a smart home, etc.

Figure 1:
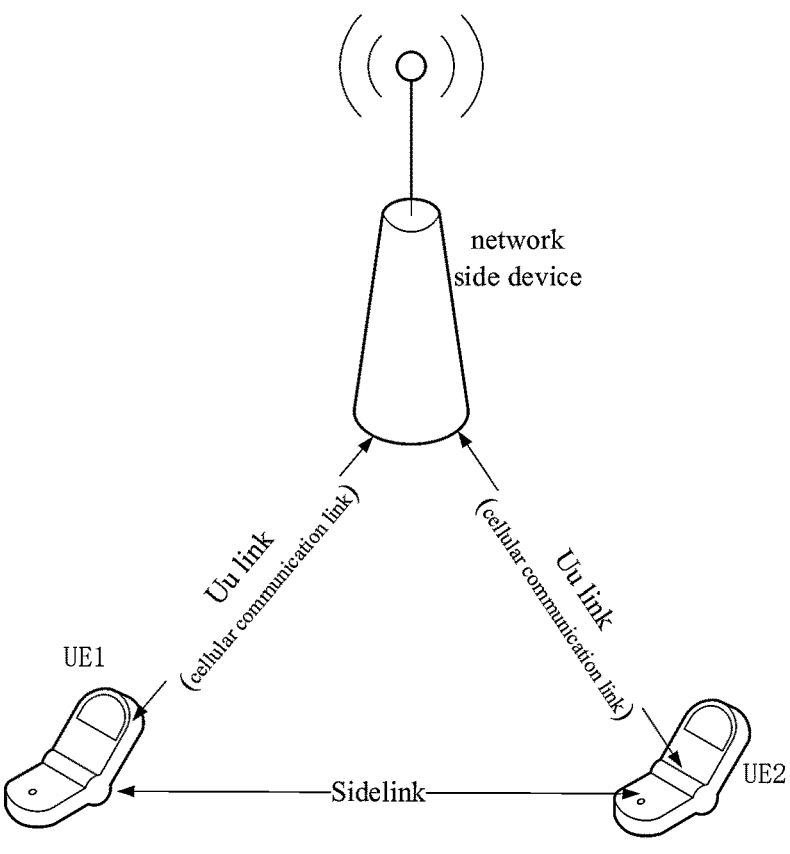
FIG. 1 is a schematic diagram of direct communication in the related art.

In a Long Term Evolution (LTE) system, direct communication is allowed between UEs. For the convenience of description, the direct communication link between UEs is defined as a Sidelink, and the corresponding wireless interface is called a direct communication interface (also called a Sidelink interface); the cellular communication link between the network side equipment and the UE is called a Uu link, and a corresponding interface is called a Uu interface. As shown in FIG. 1, UE1 and UE2 communicate directly through a Sidelink, and UE1 and UE2 communicate with a network side device through a Uu link.

It should be noted that, the UEs that communicate directly may all be on the network, or all of them may be off the network, or some UEs may be on the network, and some UEs may be off the network. The above on the network means that the UE participating in the direct communication is located within the coverage of the 3GPP base station communication carrier, and the off the network means that the UE participating in the direct communication is not within the coverage of the 3GPP base station communication carrier.

Among them, the conventional direct communication methods include the following three:

Mode 1. One-to-one communication (i.e., unicast communication) between UEs that communicate directly;

Mode 2. One UE can send the same data to all UEs in a communication group at a time (i.e. multicast communication);

Mode 3. One UE can send the same data to all nearby UEs at one time (broadcast communication) (the LTE system only supports broadcast communication).

Figure 2:
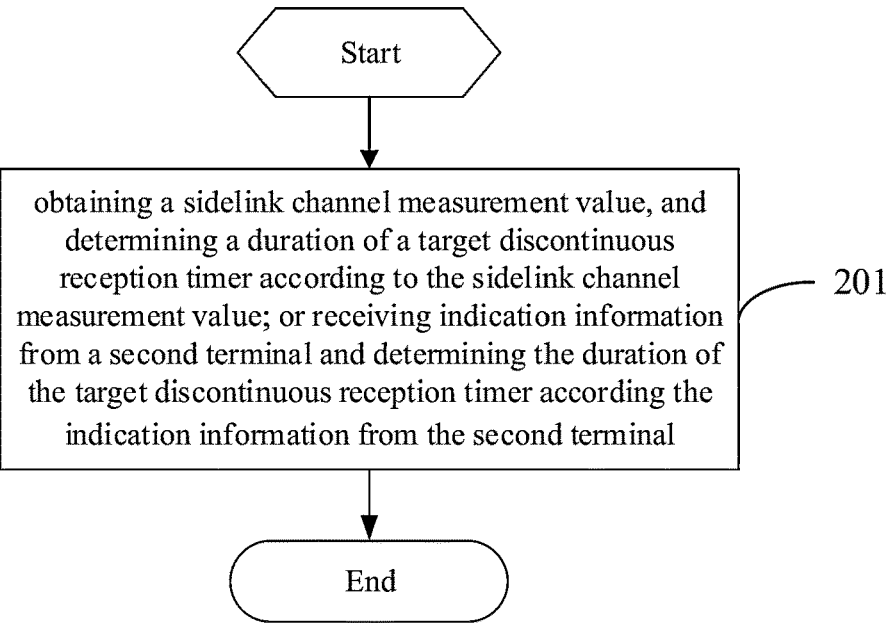
FIG. 2 is the first flowchart of the information determination method provided by the embodiment of the present disclosure.

Referring to FIG. 2, FIG. 2 is a flowchart of an information determination method provided by an embodiment of the present disclosure, applied to a first terminal, as shown in FIG. 2, including the following steps:

Step 201: obtaining a sidelink channel measurement result, and determining a timer length of a target discontinuous reception timer according to the sidelink channel measurement result; or receiving indication information from a second terminal and determining the timer length of the target discontinuous reception timer according the indication information from the second terminal; the indication information is used to indicate the timer length of the target discontinuous reception timer.

Wherein, the first terminal communicates with the second terminal through a sidelink.

Specifically, in this step, the sidelink RRC signaling or the sidelink MAC CE sent by the second terminal may be received, wherein the sidelink RRC signaling or the sidelink MAC CE is used to indicate the timer length of the target DRX timer. That is, in this mode, the second terminal determines the timer length of the target DRX timer, and sends the timer length of the target DRX timer to the first terminal.

Alternatively, in this step, the first terminal may further determine the timer length of the target DRX timer according to the obtained sidelink channel measurement result.

Specifically, the first terminal may obtain the sidelink channel measurement result in at least one of the following ways:

(1) obtaining the sidelink channel measurement result of the first terminal, that is, obtaining the sidelink channel measurement result of the first terminal itself. In this mode, the first terminal may perform measurement according to the reference signal sent by the second terminal, and then determine the sidelink channel measurement result.

(2) obtaining the sidelink channel measurement result sent by the second terminal. In this mode, the second terminal determines the sidelink channel measurement result and sends the same to the first terminal.

For example, when the first terminal receives data information sent by the second terminal, since the first terminal needs to start the DRX timer to wait for the initially transmitted or retransmitted data information from the second terminal, the first terminal needs to determine the timer length of the target DRX timer according to the sidelink channel measurement result from the second terminal.

Specifically, the first terminal receives the sidelink RRC signaling or the sidelink MAC CE sent by the second terminal, and the sidelink RRC signaling or the sidelink MAC CE includes the sidelink channel measurement result.

In this mode, in order to further facilitate the first terminal to determine the timer length of the target DRX timer, the sidelink RRC signaling or the sidelink MAC CE further includes at least one of the following information: a source layer L2 identifier, a destination L2 identifier, an SLRB identifier, or an LCID. The above-mentioned information can also be used to make the first terminal quickly distinguish that the RRC or MAC CE signaling is sent by the second terminal to the first terminal.

(3) Obtaining the sidelink channel measurement result sent by the network side device. In this way, the network side device determines the sidelink channel measurement result and sends the same to the first terminal.

Specifically, the first terminal obtains the RRC signaling or the MAC CE sent by the network side device, and the RRC signaling or the MAC CE includes the sidelink channel measurement result.

In this mode, in order to further facilitate the first terminal to determine the timer length of the target DRX timer, the RRC signaling or MAC CE further includes at least one of the following information: a source layer L2 identifier, a destination L2 identifier, an SLRB identifier, or an LCID.

In the embodiment of the present disclosure, the sidelink channel measurement result includes one or both of channel state information and channel congestion degree.

Wherein, the channel state information includes one or more of the following information:

Channel State Information (CSI), Rand Indication (RI), Channel Quality Indicator (CQI), Signal to Interference plus Noise Ratio (SINR), Reference Signal Receiving Power (RSRP), Reference Signal Receiving Quality (RSRQ), Received Signal Strength Indication (RSSI), Block Error Rate, Bit Error Rate, and Sounding Reference Signal (SRS).

The channel congestion degree includes one or more of the following information: a Channel Busy Ratio (CBR) threshold, and a channel occupancy ratio (CR).

In the above modes, the first terminal may determine the timer length of the target DRX timer according to the sidelink channel measurement result in the following mode.

Mode 1: Obtaining the correspondence between the sidelink channel measurement result and the timer length of the Discontinuous Reception (DRX) Timer, and then, determining the timer length of the target DRX timer according to the corresponding relationship and the sidelink channel measurement result.

The corresponding relationship is configured by the network side device, or the corresponding relationship is pre-configured in the first terminal. For example, the network side device may configure the corresponding relationship through dedicated RRC signaling or broadcast RRC signaling.

Specifically, the terminal in the connected state can use the corresponding relationship between the sidelink channel measurement result and the timer length of the discontinuous reception timer configured by dedicated RRC signaling, or use the corresponding relationship between sidelink channel measurement result and the timer length of the DRX timer configured by broadcast RRC signaling, or the pre-configured corresponding relationship between the sidelink channel measurement result and the timer length of the DRX timer; the terminal in idle state or in the inactive state within the coverage of the network can use the corresponding relationship between the sidelink channel measurement result and the timer length of the discontinuous reception timer configured by broadcast RRC signaling, or use the pre-configured corresponding relationship between the sidelink channel measurement result and the timer length of the discontinuous reception timer. The terminal outside the coverage of the network can use the pre-configured correspondence between the sidelink channel measurement result and the timer length of the discontinuous reception timer.

In the embodiment of the present disclosure, the correspondence between the sidelink channel measurement result and the timer length of the discontinuous reception timer may be a table, a calculation formula, or an index, etc., which is not specifically limited.

For example, the correspondence between the sidelink channel measurement result and the timer length of the DRX timer may be expressed as shown in Table 1 below.

TABLE 1

| Sidelink Channel Measurement result | DRX Timer |
| --- | --- |
| Less than or equal to the sidelink channel measurement result threshold 1 | Timer1 |
| Greater than or equal to the sidelink channel measurement result threshold 1, but Less than or equal to the sidelink channel measurement result threshold 2 | Timer2 |
| Greater than or equal to the sidelink channel measurement result threshold 2 | Timer3 |

When the sidelink channel measurement results are CBR, CR, bit error rate, and block error rate, the corresponding relationship in the form of Table 1 can be used. The value of Timer3 is greater than the value of Timer2, the value of Timer2 is greater than the value of Timer1, and the values of Timer1, Timer2, Timer3 are greater than 0. Threshold 1 is less than threshold 2 and can be set according to actual needs. In this case, the larger the sidelink channel measurement result is, the larger the corresponding DRX Timer is. For example, the higher the CBR is, the more congested the channel is, the less the sending resources available for the terminal is, and a longer timer length of DRX timer are needed by the receiving end to wait for data to be received.

When the sidelink channel measurement results are CSI, RI, CQI, SINR, RSRP, RSRQ, RSSI, the corresponding relationship in the form of Table 1 can also be used, the value of Timer3 is less than the value of Timer2, the value of Timer2 is less than the value of Timer1, and the values of Timer1, Timer2, and Timer3 are all greater than 0. Threshold 1 is less than threshold 2 and can be set according to actual needs. In this case, the larger the sidelink channel measurement result is, the smaller the corresponding DRX Timer is. For example, the larger the CSI value is, the better the channel condition is and the smaller the DRX timer is.

For example, in Table 1, after comparing with threshold 1 and threshold 2, if the sidelink channel measurement result is greater than threshold 1 but less than threshold 2, then the corresponding DRX Timer is Timer2.

Mode 2: Obtaining the corresponding relationship between the sidelink channel measurement result, QoS and the timer length of the discontinuous reception timer, and then determining the timer length of the target DRX timer according to the corresponding relationship, the Quality of Service (QoS) required by the current service, and the sidelink channel measurement result.

The corresponding relationship is configured by the network side device, or the corresponding relationship is pre-configured in the first terminal. For example, the network side device may configure the corresponding relationship through dedicated RRC signaling or broadcast RRC signaling.

In this way, the above corresponding relationship can be understood as: within the same threshold range of the sidelink channel measurement result, different timer lengths of DRX timer are determined based on different service QoS parameters, and the first terminal can select an appropriate timer length of the DRX timer according to certain principles (such as priority of services, or delay requirements of services, etc.). For example, the corresponding relationship may be a table, or a calculation formula, or an index, etc., which is not specifically limited.

For example, the corresponding relationship among the sidelink channel measurement result, the QoS, and the timer length of the DRX timer is shown in Table 2-1.

TABLE 2-1

| Sidelink channel measurement result | QoS | DRX Timer |
| --- | --- | --- |
| less than or equal to the sidelink channel measurement result threshold 1 | less than or equal to the priority threshold 1; or delay threshold 1 | Timer1 |
| | greater than or equal to the priority threshold 1; or delay threshold 1 | Timer2 |
| greater than or equal to the sidelink channel measurement result threshold 1, but less than or equal to the sidelink channel measurement result threshold 2 | less than or equal to the priority threshold 1; or delay threshold 1 | Timer3 |
| | greater than or equal to the priority threshold 1; or delay threshold 1 | Timer4 |
| greater than or equal to the sidelink channel measurement result threshold 2 | less than or equal to the priority threshold 1; or delay threshold 1 | Timer5 |
| | greater than or equal to the priority threshold 1; or delay threshold 1 | Timer6 |

When the sidelink channel measurement results are CBR, CR, bit error rate, and block error rate, the corresponding relationship in the form of Table 2-1 can be used, Timer6>Timer5>Timer4>Timer3>Timer2>Timer1, and Timer1-Timer6 are greater than 0. Threshold 1 is less than threshold 2 and can be set according to actual needs. The priority threshold 1 or the delay threshold 1 can also be set according to actual needs. In this case, the larger the sidelink channel measurement result is, the larger the corresponding DRX Timer is. For example, the higher the CBR is, the more congested the channel is, the fewer the sending resources available for the terminal to select is, and the receiving end needs a longer timer length of DRX timer to wait for data to be received. The more priority the service is or the more important the service is, the receiving end can select a longer timer length of DRX timer to wait for receiving data. The lower the service delay requirement is, the receiving end can select a shorter timer length of DRX timer to wait for receiving data.

For example, in Table 2-1, after comparing with threshold 1 and threshold 2, if the sidelink channel measurement result is greater than threshold 1 but less than threshold 2, then the corresponding DRX Timer may be Timer3 or Timer4. At the same time, since the priority of the current service is less than the priority threshold 1, it can finally be determined that the timer length of the corresponding DRX Timer is Timer3.

In Table 2-1, the higher the value of the priority of a service is, the higher the priority is, and the longer timer length of the corresponding DRX timer is. In practical applications, it can also be specified that the lower the value of the priority is, the higher the priority is, and the timer length of the corresponding DRX timer is longer. Therefore, the Table 2-1 can be changed into the form of the following Table 2-2.

TABLE 2-2

| Sidelink channel measurement result | QoS | DRX Timer |
|---|---|---|
| less than or equal to the sidelink channel measurement result threshold 1 | greater than or equal to the priority threshold 1; or delay threshold 1 | Timer1 |
| | less than or equal to the priority threshold 1; or delay threshold 1 | Timer2 |
| greater than or equal to the sidelink channel measurement result threshold 1, but less than or equal to the sidelink channel measurement result threshold 1 | greater than or equal to the priority threshold 1; or delay threshold 1 | Timer3 |
| | less than or equal to the priority threshold 1; or delay threshold 1 | Timer4 |
| greater than or equal to the sidelink channel measurement result threshold 2 | greater than or equal to the priority threshold 1; or delay threshold 1 | Timer5 |
| | less than or equal to the priority threshold 1; or delay threshold 1 | Timer6 |

In Table 2-2, when the sidelink channel measurement result is less than or equal to the sidelink channel measurement result threshold 1, if the priority value is greater than or equal to the priority threshold 1, the timer length of corresponding DRX timer is Timer1.

For another example, the corresponding relationship among the sidelink channel measurement result, the QoS and the timer length of the DRX timer is shown in Table 2-3 below.

TABLE 2-3

| Sidelink channel measurement result | QoS | DRX Timer |
|---|---|---|
| less than or equal to the sidelink channel measurement result threshold 1 | greater than or equal to the priority threshold 1; or delay threshold 1 | Timer1 |
| | less than or equal to the priority threshold 1; or delay threshold 1 | Timer2 |
| greater than or equal to the sidelink channel measurement result threshold 1, but less than or equal to the sidelink channel measurement result threshold 2 | greater than or equal to the priority threshold 1; or delay threshold 1 | Timer3 |
| | less than or equal to the priority threshold 1; or delay threshold 1 | Timer4 |
| greater than or equal to the sidelink channel measurement result threshold 2 | greater than or equal to the priority threshold 1; or delay threshold 1 | Timer5 |
| | less than or equal to the priority threshold 1; or delay threshold 1 | Timer6 |

When the sidelink channel measurement results are CSI, RI, CQI, SINR, RSRP, RSRQ, and RSSI, the corresponding relationship in the form of Table 2-3 can be used.

Among them, Timer6<Timer5<Timer4<Timer3<Timer2<Timer1, and Timer1-Timer6 are all greater than 0. Threshold 1 is less than threshold 2 and can be set according to actual needs. The priority threshold 1 or the delay threshold 1 can also be set according to actual needs. In this case, the larger the sidelink channel measurement result is, the smaller the corresponding DRX Timer is. For example, the larger the CSI value is, the better the channel condition is and the smaller the DRX timer is. The higher the priority of the service is or the more important the service is, the receiver can select a longer timer length of the timer for data to be received. The lower the service latency requirement is, the receiver can select a shorter timer length of the timer to wait for data to be received.

In Table 2-3, a higher value of priority indicates a higher priority, and the timer length of the corresponding DRX timer is longer. In practical applications, it can also be specified that the lower priority value indicates a higher priority, and the timer length of the corresponding DRX timer is longer. Therefore, the above Table 2-3 can be changed into the following Table 2-4.

TABLE 2-4

| Sidelink channel measurement result | QoS | DRX Timer |
|---|---|---|
| less than or equal to the sidelink channel measurement result threshold 1 | less than or equal to the priority threshold 1; or delay threshold 1 | Timer1 |
| | greater than or equal to the priority threshold 1; or delay threshold 1 | Timer2 |
| greater than or equal to the sidelink channel measurement result threshold 1, but less than or equal to the sidelink channel measurement result threshold 2 | less than or equal to the priority threshold 1; or delay threshold 1 | Timer3 |
| | greater than or equal to the priority threshold 1; or delay threshold 1 | Timer4 |
| greater than or equal to the sidelink channel measurement result threshold 2 | less than or equal to the priority threshold 1; or delay threshold 1 | Timer5 |
| | greater than or equal to the delay priority threshold 1; or threshold 1 | Timer6 |

In Table 2-4, when the sidelink channel measurement result is less than or equal to the sidelink channel measurement result threshold 1, if the priority value is greater than or equal to the priority threshold 1, the timer length of the corresponding DRX timer is Timer1.

Of course, the corresponding relationship may also specify the timer timer length corresponding to each service priority, or may also specify the timer timer length corresponding to each service delay requirement.

Of course, the above are merely examples to illustrate different forms of the corresponding relationship in different modes, and in specific implementation, there may also be other forms of the corresponding relationship, which are not limited in the embodiments of the present disclosure.

In this embodiment of the present disclosure, the target DRX timer includes one or more of the following timers:

Onduration timer, Short DRX cycle Timer, Long DRX cycle Timer, Inactivity Timer, Round Trip Time (RTT) Timer, Retransmission Timer.

For different timers, in the embodiments of the present disclosure, the timer lengths of the timers can also be distinguished.

For example, in this embodiment of the present disclosure, a certain rule may be preset, and the timer length of different timers may be determined according to different sidelink channel measurement results. For example, a corresponding relationship may be set. When the sidelink channel measurement results are in different ranges, the timer lengths of one or several timers correspond to a certain value, or the timer lengths of several timers correspond to different values. That is, when the sidelink channel measurement result is within a certain range, the timer length of one timer can be determined, or the timer length of multiple timers can be determined, or, even when the sidelink channel measurement result is within a certain range, different timers may also have different timer timer lengths.

For example, with reference to Table 1 or Table 2, when the sidelink channel measurement result is less than or equal to the sidelink channel measurement result threshold 1, the timer length of the Onduration timer is Timer1; when the sidelink channel measurement result is greater than or equal to the sidelink channel measurement result threshold 1, but less than or equal to the sidelink channel measurement result threshold 2, the timer length of the Short DRX cycle Timer is Timer2.

For another example, with reference to Table 1 or Table 2, when the sidelink channel measurement result is less than or equal to the sidelink channel measurement result threshold 1, the timer length of Onduration timer and Short DRX cycle Timer is Timer1, or timer lengths of Onduration timer and Short DRX cycle Timer are Timer1 and Timer1' respectively.

It should be noted that the mode of distinguishing the timer lengths of different timers may be configured together with the corresponding relationship, or may be configured independently, and the specific implementation thereof is not limited in the embodiments of the present disclosure.

In the embodiment of the present disclosure, the first terminal may determine the timer length of the target DRX timer according to the sidelink channel measurement result or the indication information of the second terminal, so that the power consumption of the first terminal can be saved, and the communication reliability of the first terminal is not reduced.

Figure 3:
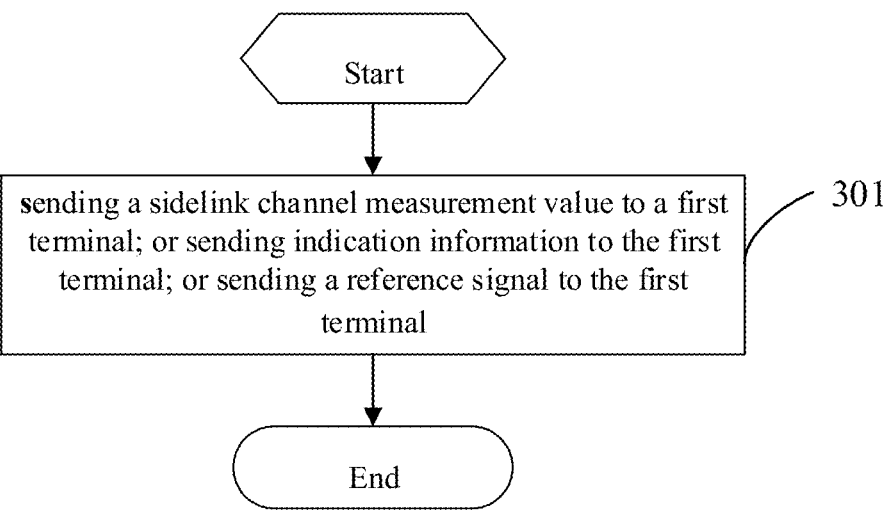
FIG. 3 is the second flow chart of the information determination method provided by the embodiment of the present disclosure.

Referring to FIG. 3, FIG. 3 is a flowchart of an information determination method provided by an embodiment of the present disclosure, applied to a second terminal, as shown in FIG. 3, including the following steps:

Step 301: Sending a sidelink channel measurement result to a first terminal, so that the first terminal determines a timer length of a target discontinuous reception timer according to the sidelink channel measurement result; or sending indication information to the first terminal, wherein the indication information is used to indicate the timer length of the target discontinuous reception timer; or sending a reference signal to the first terminal, so that the first terminal determines the sidelink channel measurement result according to the reference signal, and determining the timer length of the target DRX timer according to the sidelink channel measurement result;

Wherein, the second terminal communicates with the first terminal through a sidelink.

Specifically, the second terminal may send the sidelink RRC signaling or the sidelink MAC CE to the first terminal, wherein the sidelink RRC signaling or the sidelink MAC CE includes the sidelink channel measurement result.

Specifically, the second terminal may send the indication information to the first terminal in the following mode.

Mode 1: The second terminal can obtain the corresponding relationship between the sidelink channel measurement result and the timer length of the DRX timer, and determine the timer length of the target DRX timer according to the corresponding relationship and the sidelink channel measurement result. After that, the indication information is sent to the first terminal, the indication information is used to indicate the timer length of the target DRX timer.

Specifically, the sidelink RRC signaling or the sidelink MAC CE is sent to the first terminal, and the sidelink RRC signaling or the sidelink MAC CE includes the sidelink channel measurement result.

In this mode, the second terminal performs measurement, obtains the sidelink channel measurement result, and determines the timer length of the target DRX timer according to the corresponding relationship, wherein the corresponding relationship may be the corresponding relationship shown in Table 1.

Mode 2: The second terminal can obtain the corresponding relationship among the sidelink channel measurement result, the QoS and the timer length of the discontinuous reception timer, and the timer length of the target DRX timer is determined according to the corresponding relationship, the QoS required by the current service, and the sidelink channel measurement result. After that, the indication information is sent to the first terminal, wherein the indication information is used to indicate the timer length of the target DRX timer.

In this mode, the second terminal performs measurement, obtains the sidelink channel measurement result, and determines the timer length of the target DRX timer according to the corresponding relationship, wherein the corresponding relationship may be the corresponding relationship shown in Table 2.

In the above two modes, the second terminal may send the sidelink RRC signaling or the sidelink MAC CE to the first terminal, and the sidelink RRC signaling or the sidelink MAC CE is used to indicate the timer length of the target DRX timer.

In this mode, in order to further facilitate the first terminal to determine the timer length of the target DRX timer, the sidelink RRC signaling or the sidelink MAC CE further includes at least one of the following information: a source layer L2 identifier, a destination L2 identifier, an SLRB identifier, or an LCID. The above information can also be used to enable the first terminal to quickly distinguish that the sidelink RRC or the sidelink MAC CE signaling is sent by the second terminal to the first terminal.

In this embodiment, the corresponding relationship is configured by the network side device, or the corresponding relationship is pre-configured in the second terminal. Specifically, the corresponding relationship is configured by the network side device through dedicated RRC signaling or broadcast RRC signaling.

The meaning of the sidelink channel measurement result may refer to the description of the foregoing method embodiments, and the content of the target discontinuous reception timer may also refer to the description of the foregoing method embodiments.

In the embodiment of the present disclosure, the first terminal may determine the timer length of the target DRX timer according to the sidelink channel measurement result or the indication information of the second terminal, so that the power consumption of the first terminal can be saved, and the communication reliability of the first terminal is not reduced.

Figure 4:
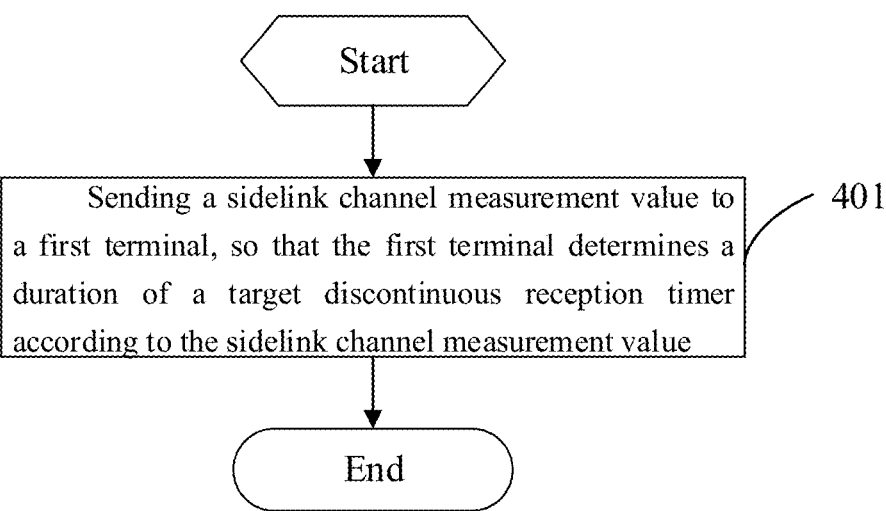
FIG. 4 is the third flowchart of the information determination method provided by the embodiment of the present disclosure.

Referring to FIG. 4, FIG. 4 is a flowchart of an information determination method provided by an embodiment of the present disclosure, applied to a network side device, as shown in FIG. 4, including the following steps:

Step 401: Sending a sidelink channel measurement result to a first terminal, so that the first terminal determines a timer length of a target discontinuous reception timer according to the sidelink channel measurement result.

Specifically, the network side device may send RRC signaling or MAC CE to the first terminal, wherein the RRC signaling or MAC CE includes the sidelink channel measurement result. The RRC signaling may be dedicated RRC signaling or broadcast RRC signaling (e.g. System Information Block, SIB). Further, the RRC signaling or the MAC CE also includes at least one of the following information: a source layer L2 identifier, a destination L2 identifier, an SLRB identifier, or an LCID, which are used to indicate that the sidelink channel measurement result is the sidelink channel measurement result between the first terminal and the second terminal.

In this embodiment of the present disclosure, reference may be made to the descriptions in the foregoing embodiments for the content of the sidelink channel measurement result.

In practical applications, the network side device may be a base station. The sidelink channel measurement result indicated by the network side device may be obtained by the network side device through the terminal. For example, the terminal reports the sidelink channel measurement result to the network side device, and the network side device indicates the sidelink channel measurement result in the serving cell (or a statistical average value of the sidelink channel measurement result reported by the terminal) to the first terminal, to determine the timer length of the target discontinuous reception timer. For example, the network side device can obtain the CBR, CR, etc. reported by any terminal within the coverage area and indicate the same to the first terminal, or the network side device can obtain the CSI, bit error rate, block error rate, RI, CQI, SINK, RSRP, RSRQ, RSSI reported by the second terminal, and indicate the same to the first terminal.

In addition, on the basis of the above embodiment, in order to facilitate the first terminal or the second terminal to determine the timer length of the DRX timer, the network side device may also send the corresponding relationship between the sidelink channel measurement result and the timer length of the discontinuous reception timer to the first terminal and/or the second terminal, or send the corresponding relationship among the sidelink channel measurement result, QoS and the timer length of the discontinuous reception timer to the first terminal and/or the second terminal, or sent the above two corresponding relationships to the first terminal and/or the second terminal.

That is to say, for the above two corresponding relationships, the network side device may send one of the corresponding relationships to one or both of the first terminal and the second terminal, or may send the two corresponding relationships to one or both of the first terminal and the second terminal.

Wherein, the corresponding relationship is sent through dedicated RRC signaling or broadcast RRC signaling. For the implementation of the corresponding relationship, reference may be made to the description of the foregoing embodiments.

In the embodiment of the present disclosure, the first terminal may determine the timer length of the target DRX timer according to the sidelink channel measurement result or the indication information of the second terminal, so that the power consumption of the first terminal can be saved, and the communication reliability of the first terminal is not reduced.

In the NR V2X in the related art, there is no DRX mechanism. For V2X terminals, especially P-UEs, the DRX mechanism of the sidelink interface needs to be introduced. For the sidelink interface mode 2, unlike the Uu interface, the terminal needs to autonomously select a sending resource in the resource pool. If there are many terminals in the nearby area and the congestion degree of the resource pool is high, the terminal may not be able to select the transmission resources and delay the transmission. Therefore, the design of the DRX timer of the receiving terminal needs to be related to the congestion degree of the resource pool, so as to adjust the Active time, while saving power consumption without losing information.

Therefore, in the embodiment of the present disclosure, to solve the above problem, the first terminal determines the timer length of the DRX timer according to the sidelink channel measurement result or the indication information of the second terminal.

Wherein, the corresponding relationship between the sidelink channel measurement result and the timer length of the DRX timer is configured by the network side device, or preconfigured to the first terminal or the second terminal. The sidelink channel measurement result may be the sidelink channel measurement result of the first terminal, or the sidelink channel measurement result indicated by the second terminal, or the sidelink channel measurement result indicated by the network side device.

Wherein, the first terminal communicates with the second terminal through a sidelink. For example, the first terminal is a transmitting terminal and the second terminal is a receiving terminal, or the first terminal is a receiving terminal and the second terminal is a transmitting terminal.

Hereinafter, the implementation process of the embodiments of the present disclosure will be described with reference to different embodiments. The first terminal is UE1, and the second terminal is UE2.

Figure 5:
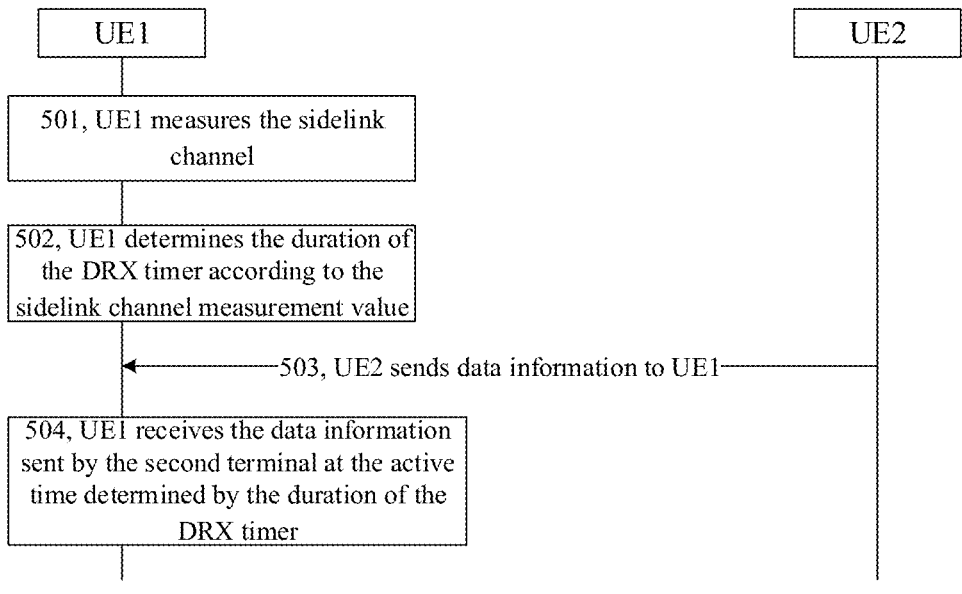
FIG. 5 is the fourth flowchart of the information determination method provided by the embodiment of the present disclosure.

In the embodiment shown in FIG. 5, the first terminal determines the timer length of the DRX timer according to the sidelink channel measurement result of the first terminal.

Referring to FIG. 5, FIG. 5 is a flowchart of an information determination method provided by an embodiment of the present disclosure, as shown in FIG. 5, including the following steps:

Step 501: UE1 measures the sidelink channel to obtain the sidelink channel measurement result.

Wherein, the sidelink channel measurement result may include one or both of channel state information and channel congestion degree.

Specifically, UE1 can measure the sidelink channel according to the reference signal (such as SRS) or data information sent by UE2, so as to obtain channel state information, such as CSI, RI, CQI, SINR, RSRP, RSRQ, RSSI, error block rate, bit error rate, etc. Alternatively, UE1 may measure the sidelink channel, so as to obtain the channel congestion degree, for example, CBR, CR, and so on.

Step 502, UE1 determines the timer length of the DRX timer according to the sidelink channel measurement result.

In this embodiment of the present disclosure, the DRX timer may be one or more of the following timers:

Onduration timer, Short DRX cycle Timer, Long DRX cycle Timer, Inactivity Timer, RTT Timer, Retransmission Timer.

For example, taking CBR and Retransmission Timer as an example, the corresponding relationship between the CBR and the timer length of Retransmission Timer can be shown in Table 3-1:

TABLE 3-1

| CBR | Retransmission Timer |
|---|---|
| less than or equal to CBR threshold 1 | Timer1 |
| greater than or equal to CBR threshold 1, but less than or equal to CBR threshold 2 | Timer2 |
| greater than or equal to CBR threshold 2 | Timer3 |

The timer length of Timer3 is greater than the timer length of Timer2, and the timer length of Timer2 is greater than the timer length of Timer1. That is, the higher the CBR is, the more congested the channel is, the less transmission resources available to the terminal is, and the receiver needs a longer timer to wait for the retransmission of the Hybrid Automatic Repeat reQuest (HARQ) process. Wherein, CBR threshold 1 is less than CBR threshold 2.

For example, for the CBR value obtained in step 401, it is determined by looking up Table 3-1 that the CBR is less than or equal to the CBR threshold 1, then the timer length of the Retransmission Timer is Timer1.

For another example, taking CBR and Retransmission Timer as an example, the corresponding relationship among CBR, QoS and the timer length of Retransmission Timer can be shown in Table 3-2:

TABLE 3-2

| CBR | QoS | Retransmission Timer |
|---|---|---|
| less than or equal to CBR threshold 1 | less than or equal to the priority threshold 1; or delay threshold 1 | Timer1 |
| | greater than or equal to the priority threshold 1; or delay threshold 1 | Timer2 |
| greater than or equal to CBR threshold 1, but less than or equal to | less than or equal to the priority threshold 1; or delay threshold 1 | Timer3 |
| | greater than or equal to the priority threshold 1; or delay threshold 1 | Timer4 |

TABLE 3-2-continued

| CBR | QoS | Retransmission Timer |
|---|---|---|
| CBR threshold 2 greater than or equal to CBR threshold 2 | less than or equal to the priority threshold 1; or delay threshold 1 | Timer5 |
| | greater than or equal to the priority threshold 1; or delay threshold 1 | Timer6 |

Among them, Timer1<Timer2<Timer3<Timer4<Timer5<Timer6. That is, the higher the CBR is, the more congested the channel is, the fewer transmission resources are available for the terminal to select, and the receiving end needs a longer timer timer length to wait for the retransmission of the HARQ process. Wherein, CBR threshold 1 is less than CBR threshold 2.

For example, for the CBR value obtained in step 501, by looking up Table 3-2, it is determined that the CBR is less than or equal to the CBR threshold 1, and the Qos is greater than or equal to the priority threshold 1, then the timer length of the Retransmission Timer is Timer2.

For another example, taking CBR and Retransmission Timer as an example, the corresponding relationship among CBR, QoS and the timer length of Retransmission Timer can be shown in Table 3-3:

TABLE 3-3

| CBR | QoS | Retransmission Timer |
|---|---|---|
| less than or equal to CBR threshold 1 | greater than or equal to the priority threshold 1; or delay threshold 1 | Timer1 |
| | less than or equal to the priority threshold 1; or delay threshold 1 | Timer2 |
| greater than or equal to CBR threshold 1, but less than or equal to CBR threshold 2 | greater than or equal to the priority threshold 1; or delay threshold 1 | Timer3 |
| | less than or equal to the priority threshold 1; or delay threshold 1 | Timer4 |
| greater than or equal to CBR threshold 2 | greater than or equal to the priority threshold 1; or delay threshold 1 | Timer5 |
| | less than or equal to the priority threshold 1; or delay threshold 1 | Timer6 |

Among them, Timer1<Timer2<Timer3<Timer4<Timer5<Timer6. That is, the higher the CBR is, the more congested the channel is, the fewer transmission resources are available for the terminal to select, and the receiving end needs a longer timer timer length to wait for the retransmission of the HARQ process. Wherein, CBR threshold 1 is less than CBR threshold 2.

For example, for the CBR value obtained in step 501, by looking up Table 3-2, it is determined that the CBR is less than or equal to the CBR threshold 1, and the Qos is greater than or equal to the priority threshold 1, then the timer length of the Retransmission Timer is Timer1.

For example, for the CBR value obtained in step 501, by looking up Table 3-2, it is determined that the CBR is less than or equal to the CBR threshold 1, and the Qos is less than the priority threshold 1, then the timer length of the Retransmission Timer is Timer2.

Step 503: UE2 sends data information to UE1.

Step 504: UE1 receives the data information sent by the second terminal at the active time determined by the timer length of the DRX timer.

If the data decoding in the HARQ process is unsuccessful, after the RTT Timer expires, the UE starts the Retransmission Timer. During the retransmission Timer, the UE monitors control signaling and waits for retransmission data information corresponding to the HARQ process.

Figure 6:
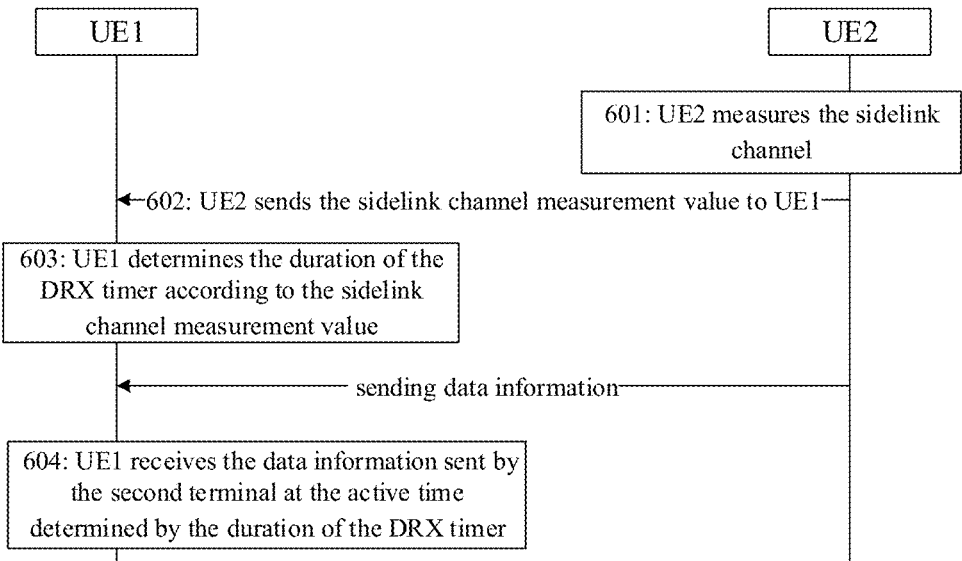
FIG. 6 is the fifth flowchart of the information determination method provided by the embodiment of the present disclosure.

In the embodiment shown in FIG. 6, the first terminal determines the timer length of the DRX timer according to the sidelink channel measurement result of the second terminal.

Referring to FIG. 6, FIG. 6 is a flowchart of an information determination method provided by an embodiment of the present disclosure, as shown in FIG. 6, including the following steps:

Step 601: UE2 measures the sidelink channel to obtain the sidelink channel measurement result.

Wherein, the sidelink channel measurement result may include one or both of channel state information and channel congestion degree.

Specifically, UE2 can measure the sidelink channel according to the reference signal (such as SRS) or data information sent by UE1, so as to obtain channel state information, such as CSI, RI, CQI, SINR, RSRP, RSRQ, RSSI, error block rate, bit error rate, etc. Alternatively, UE2 may measure the sidelink channel, so as to obtain the channel congestion degree, for example, CBR, CR, and so on.

Step 602: UE2 sends the sidelink channel measurement result to UE1 by using SL RRC or SL MAC CE.

Step 603: UE1 determines the timer length of the DRX timer according to the sidelink channel measurement result.

In this embodiment of the present disclosure, the DRX timer may be one or more of the following timers:

Onduration timer, Short DRX cycle Timer, Long DRX cycle Timer, Inactivity Timer, RTT Timer, Retransmission Timer.

Taking CBR and Retransmission Timer as an example, the corresponding relationship between CBR and the timer length of Retransmission Timer can be shown in Table 4 below:

TABLE 4

| CBR | Retransmission Timer |
|---|---|
| less than or equal to CBR threshold 1 | Timer1 |
| greater than or equal to CBR threshold 1, but less than or equal to CBR threshold 2 | Timer2 |
| greater than or equal to CBR threshold 2 | Timer3 |

The timer length of Timer3 is greater than the timer length of Timer2, and the timer length of Timer2 is greater than the timer length of Timer1. That is, the higher the CBR is, the more congested the channel is, the less transmission resources are available for the terminal to select, and the receiving end needs a longer timer timer length to wait for the retransmission of the HARQ process.

For example, for the CBR value obtained in step 602, by looking up Table 4, it is determined that the CBR is less than or equal to the CBR threshold 1, then the timer length of the Retransmission Timer is Timer1.

In the embodiment of the present disclosure, the UE1 may also determine the timer length of the Retransmission Timer when the CBR is a specific value according to the corresponding relationship among the CBR, the QoS, and the timer length of the Retransmission Timer. At this time, reference may be made to the relevant description in step 502 in the embodiment shown in FIG. 5 for the mode determined by the UE1.

Step 604: UE2 sends data information to UE1.

Step 605: UE1 receives the data information sent by the second terminal at the active time determined by the timer length of the DRX timer.

If the data decoding in the HARQ process is unsuccessful, after the RTT Timer expires, the UE starts the Retransmission Timer. During the Retransmission Timer, the UE monitors control signaling and waits for retransmission data information corresponding to the HARQ process.

Figure 7:
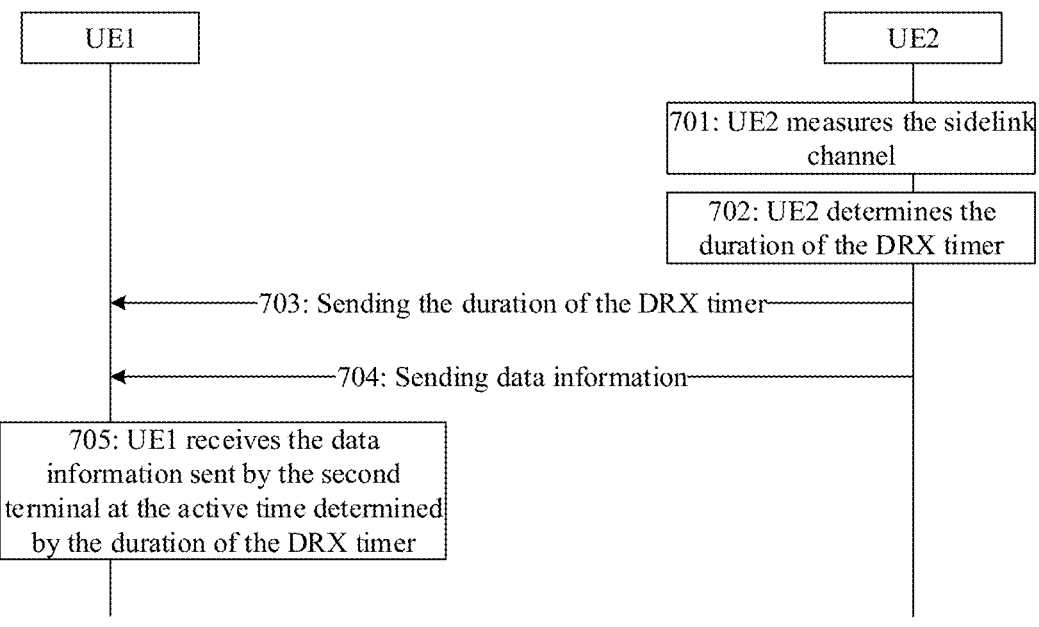
FIG. 7 is the sixth flowchart of the information determination method provided by the embodiment of the present disclosure.

In the embodiment shown in FIG. 7, the first terminal determines the timer length of the DRX timer according to the indication information of the second terminal.

Referring to FIG. 7, FIG. 7 is a flowchart of an information determination method provided by an embodiment of the present disclosure, as shown in FIG. 7, including the following steps:

Step 701: UE2 measures the sidelink channel to obtain the sidelink channel measurement result.

Wherein, the sidelink channel measurement result may include one or both of channel state information and channel congestion degree.

Specifically, UE2 can measure the sidelink channel according to the reference signal (such as SRS) or data information sent by UE1, so as to obtain channel state information, such as CSI, RI, CQI, SINR, RSRP, RSRQ, RSSI, error block rate, bit error rate, etc. Alternatively, UE2 may measure the sidelink channel, so as to obtain the channel congestion degree, for example, CBR, CR, and so on.

Step 702: UE2 determines the timer length of the DRX timer according to the sidelink channel measurement result.

In this embodiment of the present disclosure, the DRX timer may be one or more of the following timers:

Onduration timer, Short DRX cycle Timer, Long DRX cycle Timer, Inactivity Timer, RTT Timer, Retransmission Timer.

Taking CBR and Retransmission Timer as an example, the corresponding relationship between the CBR and the timer length of Retransmission Timer is shown in Table 5:

TABLE 5

| CBR | Retransmission Timer |
|---|---|
| less than or equal to CBR threshold 1 | Timer1 |
| greater than or equal to CBR threshold 1, but less than or equal to CBR threshold 2 | Timer2 |
| greater than or equal to CBR threshold 2 | Timer3 |

The timer length of Timer3 is greater than the timer length of Timer2, and the timer length of Timer2 is greater than the timer length of Timer1. That is, the higher the CBR is, the more congested the channel is, the less transmission resources are available for the terminal to select, and the receiving end needs a longer timer timer length to wait for the retransmission of the HARQ process.

For example, for the CBR value obtained in step 701, it is determined by looking up Table 5 that the CBR is greater than or equal to CBR threshold 1, but less than or equal to CBR threshold 2, then the timer length of the Retransmission Timer is Timer2.

In the embodiment of the present disclosure, the UE2 may also determine the timer length of the Retransmission Timer when the CBR is a specific value according to the corresponding relationship among the CBR, the QoS, and the timer length of the Retransmission Timer. At this time, reference may be made to the relevant description in step 502 in the embodiment shown in FIG. 5 for the mode determined by the UE2.

Step 703: Send the timer length of the DRX timer to UE1.

The second terminal may determine the timer length of the Retransmission Timer, for example, Timer1, according to the above table and the channel measurement result in step 7701, and then indicate Timer1 to the first terminal through SL RRC or SL MAC CE.

Step 704: UE2 sends data information to UE1.

Step 705: UE1 receives the data information sent by the second terminal at the active time determined by the timer length of the DRX timer.

If the data decoding in the HARQ process is unsuccessful, after the RTT Timer expires, the UE starts the Retransmission Timer. During the Retransmission Timer, the UE monitors control signaling and waits for retransmission data information corresponding to the HARQ process.

Figure 8:
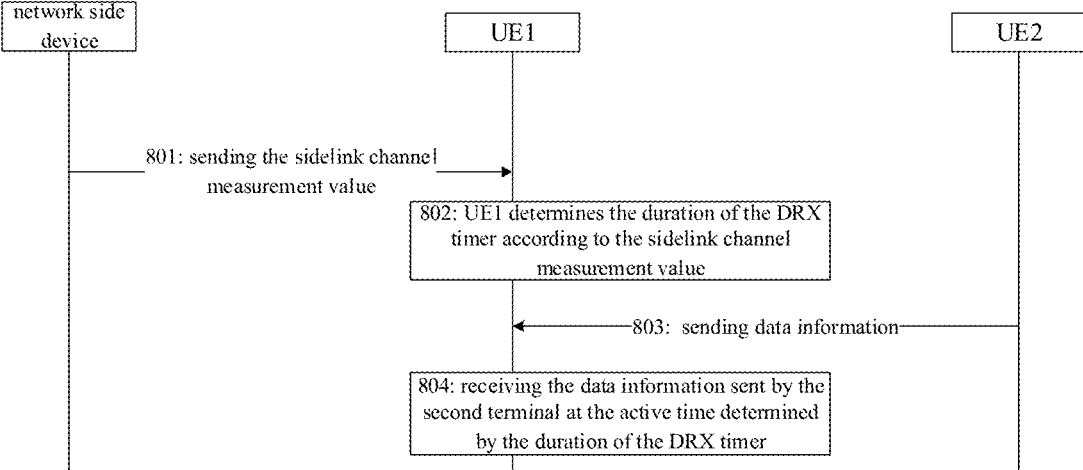
FIG. 8 is a seventh flowchart of the information determination method provided by an embodiment of the present disclosure.

In the embodiment shown in FIG. 8, the first terminal determines the timer length of the DRX timer according to the sidelink channel measurement result indicated by the network side device (e.g., the base station).

FIG. 8 is a flowchart of an information determination method provided by an embodiment of the present disclosure, as shown in FIG. 8, including the following steps:

Step 801, the network side device sends the sidelink channel measurement result to UE1 by using RRC or MAC CE.

The sidelink channel measurement result may be: channel state information, for example, one or more of CSI, RI, CQI, SINR, RSRP, RSRQ, RSSI, block error rate, bit error rate, etc., or may be a channel congestion degree, for example, one or more of CBR, CR, etc.

Step 802: UE1 determines the timer length of the DRX timer according to the sidelink channel measurement result.

In this embodiment of the present disclosure, the DRX timer may be one or more of the following timers:

Onduration timer, Short DRX cycle Timer, Long DRX cycle Timer, Inactivity Timer, RTT Timer, Retransmission Timer.

Taking CBR and Retransmission Timer as an example, the corresponding relationship between the CBR and the timer length of Retransmission Timer is shown in Table 6 below:

TABLE 6

| CBR | Retransmission Timer |
|---|---|
| less than or equal to CBR threshold 1 | Timer1 |
| greater than or equal to CBR threshold 1, but less than or equal to CBR threshold 2 | Timer2 |
| greater than or equal to CBR threshold 2 | Timer3 |

The timer length of Timer3 is greater than the timer length of Timer2, and the timer length of Timer2 is greater than the timer length of Timer1. That is, the higher the CBR is, the more congested the channel is, the less transmission resources are available for the terminal to select, and the receiving end needs a longer timer timer length to wait for the retransmission of the HARQ process.

For example, for the CBR value obtained in step 801, it is determined by looking up Table 6 that the CBR is greater than the CBR threshold2, then the timer length of the Retransmission Timer is Timer3.

In the embodiment of the present disclosure, the UE1 may also determine the timer length of the Retransmission Timer when the CBR is a specific value according to the corresponding relationship among the CBR, the QoS, and the timer length of the Retransmission Timer. At this time, reference may be made to the relevant description in step 502 in the embodiment shown in FIG. 5 for the mode determined by the UE1.

Step 803: UE2 sends data information to UE1.

Step 804: UE1 receives the data information sent by the second terminal at the active time determined by the timer length of the DRX timer.

If the data decoding in the HARQ process is unsuccessful, after the RTT Timer expires, the UE starts the Retransmission Timer. During the Retransmission Timer, the UE monitors control signaling and waits for retransmission data information corresponding to the HARQ process.

It can be seen from the above description that the first terminal can determine the timer length of the DRX timer according to the sidelink channel measurement result, thereby saving the power consumption of the terminal and not reducing the communication reliability of the terminal.

Figure 9:
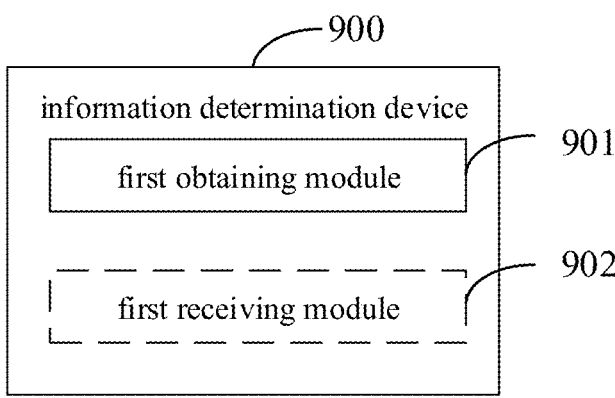
FIG. 9 is the first structural diagrams of an information determination apparatus provided by an embodiment of the present disclosure.

An embodiment of the present disclosure further provides an information determination device, which is applied to the first terminal. Referring to FIG. 9, FIG. 9 is a structural diagram of the information determination device provided by an embodiment of the present disclosure. Since the principle of the information determination device for solving the problem is similar to the information determination method in the embodiment of the present disclosure, the implementation of the information determination device may refer to the implementation of the method, and the repetition will not be repeated.

As shown in FIG. 9, the information determination device 900 includes:

a first obtaining module 901, configured to obtain a sidelink channel measurement result, and determine a timer length of a target discontinuous reception timer according to the sidelink channel measurement result; or a first receiving module 902, configured to receive indication information from a second terminal and determine the timer length of the target discontinuous reception timer according the indication information from the second terminal; the indication information is used to indicate the timer length of the target discontinuous reception timer;

Wherein, the first terminal communicates with the second terminal through a sidelink.

Optionally, the first receiving module 902 is specifically configured to receive a sidelink radio resource control RRC signaling or the sidelink media access control MAC control element CE sent by the second terminal, the sidelink RRC signaling or the sidelink MAC CE is used to indicate the timer length of the target DRX timer.

Optionally, the first obtaining module 901 is specifically configured to execute at least one of the following:

obtaining the sidelink channel measurement result of the first terminal; obtaining the sidelink channel measurement result sent by the second terminal; obtaining the sidelink channel measurement result sent by the network side device.

Optionally, the first obtaining module 901 is specifically configured to receive the sidelink RRC signaling or the sidelink MAC CE sent by the second terminal, the sidelink RRC signaling or the sidelink MAC CE includes the sidelink channel measurement result.

Optionally, the sidelink RRC signaling or the sidelink MAC CE further includes at least one of the following information: a source layer L2 identifier, a destination L2 identifier, an SLRB identifier, or an LCID.

Optionally, the first obtaining module 901 is specifically configured to obtain the RRC signaling or the MAC CE sent by the network side device, wherein the RRC signaling or the MAC CE includes the sidelink channel measurement result.

Optionally, the RRC signaling or the MAC CE further includes at least one of the following information: a source layer L2 identifier, a destination L2 identifier, an SLRB identifier, or an LCID.

Optionally, the first obtaining module 901 may include:

a first obtaining sub-module, configured to obtain a corresponding relationship between the sidelink channel measurement result and the timer length of the discontinuous reception timer; a first determination sub-module, configured to determine the timer length of the target DRX timer according the corresponding relationship and the sidelink channel measurement result.

Optionally, the first obtaining module 901 may include:

a second obtaining submodule, configured to obtain a corresponding relationship among the sidelink channel measurement result, QoS and the timer length of the discontinuous reception timer; and a second determination submodule, configured to determine the timer length of the target DRX timer according to the corresponding relationship, QoS required by a current service and the sidelink channel measurement result.

Optionally, the corresponding relationship is configured by a network side device, or the corresponding relationship is pre-configured in the first terminal.

Optionally, the corresponding relationship is configured by the network side device through dedicated RRC signaling or broadcast RRC signaling.

Optionally, the sidelink channel measurement result includes one or more of channel state information and channel congestion degree;

The channel state information includes one or more of the following information:

CSI, RI, CQI, SINK, RSRP, RSRQ, RSSI, block error rate, bit error rate and SRS;

The channel congestion degree includes one or more of the following information: CBR threshold, CR.

Optionally, the target discontinuous reception timer includes one or more of the following timers:

Onduration timer, Short DRX cycle Timer, Long DRX cycle Timer, Inactivity Timer, RTT Timer, Retransmission Timer.

The device provided by the embodiment of the present disclosure can execute the foregoing method embodiments, and the implementation principles and technical effects thereof are similar, and details are not described herein again in this embodiment.

Figure 10:
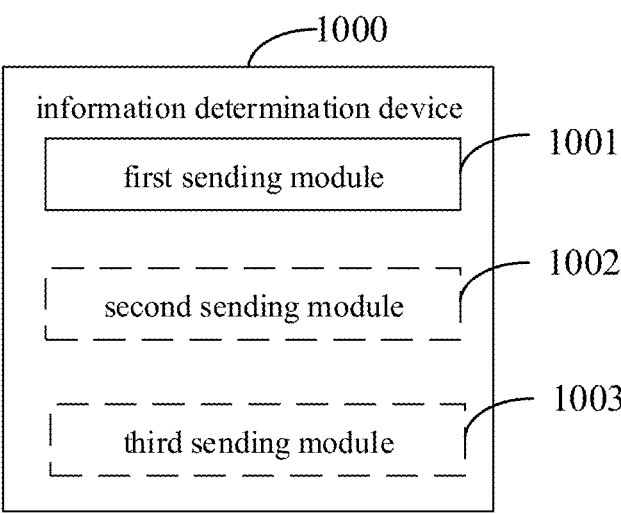
FIG. 10 is the second structural diagram of an information determination apparatus provided by an embodiment of the present disclosure.

An embodiment of the present disclosure further provides an information determination device, which is applied to a second terminal. Referring to FIG. 10, FIG. 10 is a structural diagram of an information determination device provided by an embodiment of the present disclosure. Since the principle of the information determination device for solving the problem is similar to the information determination method in the embodiment of the present disclosure, the implementation of the information determination device may refer to the implementation of the method, and the repetition will not be repeated.

As shown in FIG. 10, the information determination device 1000 includes:

A first sending module 1001, configured to send a sidelink channel measurement result to a first terminal, so that the first terminal determines a timer length of a target discontinuous reception timer according to the sidelink channel measurement result; or A second sending module 1002, configured to send indication information to the first terminal, wherein the indication information is used to indicate the timer length of the target discontinuous reception timer; or A third sending module 1003, configured to send a reference signal to the first terminal, so that the first terminal determines the sidelink channel measurement result according to the reference signal, and determine the timer length of the target DRX timer according to the sidelink channel measurement result;

Wherein, the second terminal communicates with the first terminal through a sidelink.

Optionally, the first sending module 1001 is specifically configured to send, to the first terminal, sidelink RRC signaling or sidelink MAC CE, the sidelink RRC signaling or the sidelink MAC CE includes the sidelink channel measurement result.

Optionally, the second sending module 1002 may include:

a first obtaining sub-module, configured to obtain a corresponding relationship between the sidelink channel measurement result and the timer length of the discontinuous reception timer; a first determination sub-module, configured to determine the timer length of the target discontinuous reception timer according to the corresponding relationship and the sidelink channel measurement result; a first sending submodule, configured to send indication information to the first terminal, wherein the indication information is used to indicate the timer length of the target discontinuous reception timer.

Optionally, the first sending submodule is specifically configured to send sidelink RRC signaling or sidelink MAC CE to the first terminal, the sidelink RRC signaling or the sidelink MAC CE is used to indicate the timer length of the target DRX timer.

Optionally, the second sending module 1002 may include:

a second obtaining submodule, configured to obtain a corresponding relationship among the sidelink channel measurement result, QoS and the timer length of the discontinuous reception timer; a second determination submodule, configured to determine the timer length of the target DRX timer according the corresponding relationship, QoS required by a current service and the sidelink channel measurement result, a second sending submodule, configured to send indication information to the first terminal, wherein the indication information is used to indicate the timer length of the target DRX timer.

Optionally, the second sending sub-module is specifically configured to send the sidelink RRC signaling or the sidelink MAC CE to the first terminal, the sidelink RRC signaling or the sidelink MAC CE is used to indicate the timer length of the target DRX timer.

Optionally, the sidelink RRC signaling or the sidelink MAC CE further includes at least one of the following information: a source layer L2 identifier, a destination L2 identifier, an SLRB identifier, or an LCID.

Optionally, the corresponding relationship is configured by a network side device, or the corresponding relationship is pre-configured in the second terminal.

Optionally, the corresponding relationship is configured by the network side device through dedicated RRC signaling or broadcast RRC signaling.

Optionally, the sidelink channel measurement result includes one or both of channel state information and channel congestion degree;

The channel state information includes one or more of the following information:

CSI, RI, CQI, SINK, RSRP, RSRQ, RSSI, block error rate, bit error rate and SRS;

The channel congestion degree includes one or more of the following information: CBR threshold, CR.

Optionally, the target discontinuous reception timer includes one or more of the following timers:

Onduration timer, Short DRX cycle Timer, Long DRX cycle Timer, Inactivity Timer, RTT Timer, Retransmission Timer.

The device provided by the embodiment of the present disclosure can execute the foregoing method embodiments, and the implementation principles and technical effects thereof are similar, and details are not described herein again in this embodiment.

Figure 11:
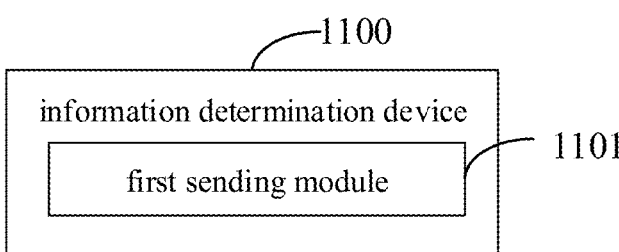
FIG. 11 is the third structural diagram of an information determination apparatus provided by an embodiment of the present disclosure.

The embodiment of the present disclosure also provides an information determination device, which is applied to a network side device. Referring to FIG. 11, FIG. 11 is a structural diagram of an information determination device provided by an embodiment of the present disclosure. Since the principle of the information determination device for solving the problem is similar to the information determination method in the embodiment of the present disclosure, the implementation of the information determination device may refer to the implementation of the method, and the repetition will not be repeated.

As shown in FIG. 11, the information determination device 1100 includes:

a first sending module 1101, configured to send a sidelink channel measurement result to a first terminal, so that the first terminal determines a timer length of a target discontinuous reception timer according to the sidelink channel measurement result.

Optionally, the first sending module 1101 is configured to send RRC signaling or MAC CE to the first terminal, wherein the RRC signaling or the MAC CE includes the sidelink channel measurement result.

Optionally, the RRC signaling or the MAC CE further includes at least one of the following information: a source layer L2 identifier, a destination L2 identifier, an SLRB identifier, or an LCID.

Optionally, the device may further include any one or two of the following modules:

a second sending module, configured to send a corresponding relationship between the sidelink channel measurement result and the timer length of the discontinuous reception timer to the first terminal and/or the second terminal;

a third sending module, configured to send a corresponding relationship among the sidelink channel measurement result, the QoS and the timer length of the discontinuous reception timer to the first terminal and/or the second terminal.

Optionally, the corresponding relationship is sent through dedicated RRC signaling or broadcast RRC signaling.

The device provided by the embodiment of the present disclosure can execute the foregoing method embodiments, and the implementation principles and technical effects thereof are similar, and details are not described herein again in this embodiment.

Figure 12:
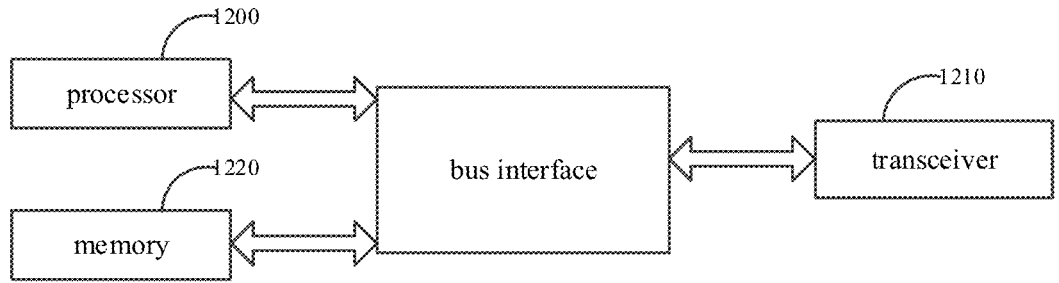
FIG. 12 is the first structural diagram of a communication device provided by an embodiment of the present disclosure.

As shown in FIG. 12, the communication device of the embodiment of the present disclosure, applied to a network side device, includes: a processor 1200, configured to read a program in a memory 1220, and perform the following processes:

sending RRC signaling or MAC CE to a first terminal, wherein the RRC signaling or MAC CE includes the sidelink channel measurement result.

The transceiver 1210 is used to receive and transmit data under the control of the processor 1200.

In FIG. 12, the bus architecture may include any number of interconnected buses and bridges, specifically various circuits of one or more processors represented by processor 1200 and memory represented by memory 1220 are linked together. The bus architecture may also link various other circuits together, such as peripherals, voltage regulators, and power management circuits, which are well known in the art and, therefore, will not be described further herein. The bus interface provides the interface. Transceiver 1210 may be a number of elements, including transmitters and transceivers that provide means for communicating with various other devices over a transmission medium. The processor 1200 is responsible for managing the bus architecture and general processing, and the memory 1220 may store data used by the processor 1200 in performing operations.

The processor 1200 is responsible for managing the bus architecture and general processing, and the memory 1220 may store data used by the processor 1200 in performing operations.

Optionally, the RRC signaling or the MAC CE further includes at least one of the following information:

a source layer L2 identifier, a destination L2 identifier, an SLRB identifier, or an LCID.

The processor 1200 is further configured to read the program and perform at least one of the following steps:

sending a corresponding relationship between the sidelink channel measurement result and the timer length of the discontinuous reception timer to the first terminal and/or the second terminal;

sending a corresponding relationship among the sidelink channel measurement result, the QoS and the timer length of the discontinuous reception timer to the first terminal and/or the second terminal.

Optionally, the corresponding relationship is sent through dedicated RRC signaling or broadcast RRC signaling.

Figure 13:
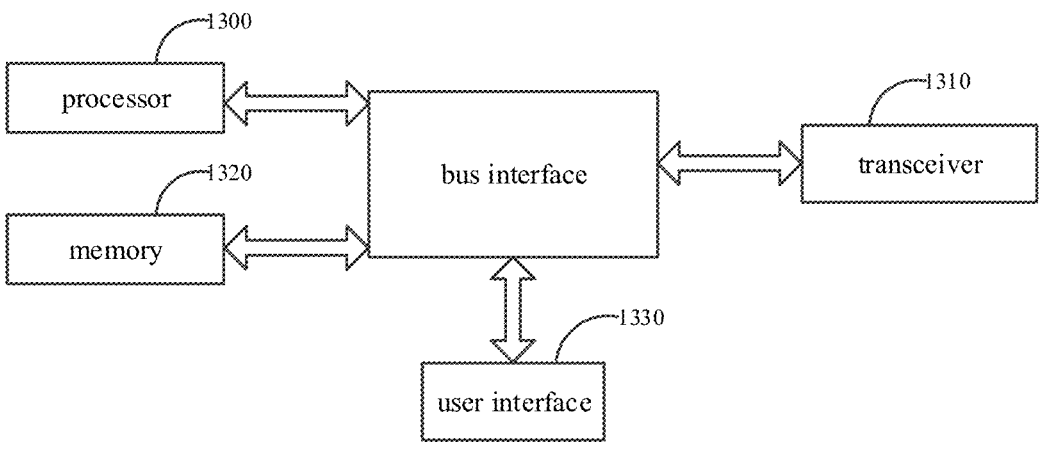
FIG. 13 is the second structural diagram of a communication device provided by an embodiment of the present disclosure.

As shown in FIG. 13, the communication device of the embodiment of the present disclosure, applied to the first terminal, includes: a processor 1300, configured to read a program in the memory 1320, and perform the following processes:

Obtaining a sidelink channel measurement result, and determining a timer length of a target discontinuous reception timer according to the sidelink channel measurement result; or receiving indication information from a second terminal and determining the timer length of the target discontinuous reception timer according the indication information from the second terminal; the indication information is used to indicate the timer length of the target discontinuous reception timer;

The transceiver 1310 is used to receive and transmit data under the control of the processor 1300.

As shown in FIG. 13, the bus architecture may include any number of interconnected buses and bridges, specifically various circuits of one or more processors represented by processor 1300 and memory represented by memory 1320 are linked together. The bus architecture may also link various other circuits together, such as peripherals, voltage regulators, and power management circuits, which are well known in the art and, therefore, will not be described further herein. The bus interface provides the interface. Transceiver 1310 may be a number of elements, including a transmitter and a receiver that provide a means for communicating with various other devices over a transmission medium. For different UEs, the user interface 1330 may also be an interface capable of externally and internally connecting the required equipment, and the connected equipment includes but is not limited to a keypad, a display, a speaker, a microphone, a joystick, and the like.

The processor 1300 is responsible for managing the bus architecture and general processing, and the memory 1320 may store data used by the processor 1300 in performing operations.

The processor 1300 is further configured to read the program and perform the following steps:

receiving a sidelink radio resource control RRC signaling or the sidelink media access control MAC control element CE sent by the second terminal, the sidelink RRC signaling or the sidelink MAC CE is used to indicate the timer length of the target DRX timer.

The processor 1300 is further configured to read the program, and perform at least one of the following steps:

obtaining the sidelink channel measurement result of the first terminal;

obtaining the sidelink channel measurement result sent by the second terminal;

obtaining the sidelink channel measurement result sent by the network side device.

The processor 1300 is further configured to read the program and perform the following steps:

receiving the sidelink RRC signaling or the sidelink MAC CE sent by the second terminal, the sidelink RRC signaling or the sidelink MAC CE includes the sidelink channel measurement result.

Wherein, the sidelink RRC signaling or the sidelink MAC CE further includes at least one of the following information: a source layer L2 identifier, a destination L2 identifier, an SLRB identifier, or an LCID.

The processor 1300 is further configured to read the program and perform the following steps:

obtaining the RRC signaling or the MAC CE sent by the network side device, wherein the RRC signaling or the MAC CE includes the sidelink channel measurement result.

Wherein, the RRC signaling or the MAC CE further includes at least one of the following information: a source layer L2 identifier, a destination L2 identifier, an SLRB identifier, or an LCID.

The processor 1300 is further configured to read the program and perform the following steps:

obtaining a corresponding relationship between the sidelink channel measurement result and the timer length of the discontinuous reception timer;

determining the timer length of the target DRX timer according the corresponding relationship and the sidelink channel measurement result.

The processor 1300 is further configured to read the program and perform the following steps:

obtaining a corresponding relationship among the sidelink channel measurement result, QoS and the timer length of the discontinuous reception timer; and determining the timer length of the target DRX timer according to the corresponding relationship, QoS required by a current service and the sidelink channel measurement result.

Optionally, the corresponding relationship is configured by a network side device, or the corresponding relationship is pre-configured in the first terminal.

Optionally, the corresponding relationship is configured by the network side device through dedicated RRC signaling or broadcast RRC signaling.

Optionally, the sidelink channel measurement result includes one or more of channel state information and channel congestion degree;

The channel state information includes one or more of the following information:

CSI, RI, CQI, SINK, RSRP, RSRQ, RSSI, block error rate, bit error rate and SRS;

The channel congestion degree includes one or more of the following information: CBR threshold, CR.

Optionally, the target discontinuous reception timer includes one or more of the following timers:

Onduration timer, Short DRX cycle Timer, Long DRX cycle Timer, Inactivity Timer, RTT Timer, Retransmission Timer.

Figure 14:
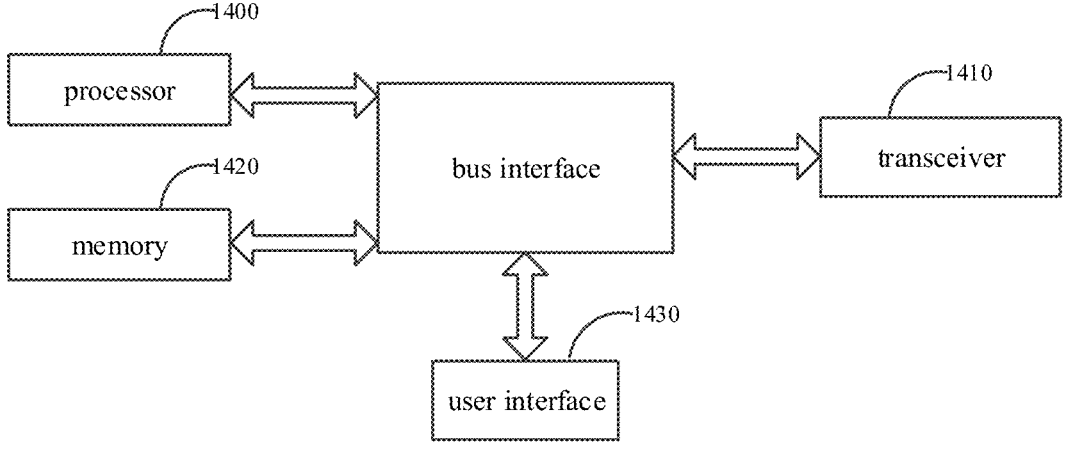
FIG. 14 is the third structural diagram of a communication device provided by an embodiment of the present disclosure.

As shown in FIG. 14, the communication device according to the embodiment of the present disclosure, applied to the second terminal, includes: a processor 1400, configured to read a program in the memory 1420, and perform the following processes:

sending a sidelink channel measurement result to a first terminal, so that the first terminal determines a timer length of a target discontinuous reception timer according to the sidelink channel measurement result; or sending indication information to the first terminal, wherein the indication information is used to indicate the timer length of the target discontinuous reception timer; or sending a reference signal to the first terminal, so that the first terminal determines the sidelink channel measurement result according to the reference signal, and determine the timer length of the target DRX timer according to the sidelink channel measurement result;

Wherein, the second terminal communicates with the first terminal through a sidelink.

The transceiver 1410 is used for receiving and transmitting data under the control of the processor 1400.

As shown in FIG. 14, the bus architecture may include any number of interconnected buses and bridges, specifically various circuits of one or more processors represented by processor 1400 and memory represented by memory 1420 are linked together. The bus architecture may also link various other circuits together, such as peripherals, voltage regulators, and power management circuits, which are well known in the art and, therefore, will not be described further herein. The bus interface provides the interface. Transceiver 1410 may be a number of elements, including a transmitter and a receiver that provide a means for communicating with various other devices over a transmission medium. For different UEs, the user interface 1430 may also be an interface capable of externally or internally connecting the required equipment, and the connected equipment includes but is not limited to a keypad, a display, a speaker, a microphone, a joystick, and the like.

The processor 1400 is responsible for managing the bus architecture and general processing, and the memory 1420 may store data used by the processor 1400 in performing operations.

The processor 1400 is further configured to read the program and perform the following steps:

sending, to the first terminal, sidelink RRC signaling or sidelink MAC CE, the sidelink RRC signaling or the sidelink MAC CE includes the sidelink channel measurement result.

The processor 1400 is further configured to read the program and perform the following steps:

obtaining a corresponding relationship between the sidelink channel measurement result and the timer length of the discontinuous reception timer;

determining the timer length of the target discontinuous reception timer according to the corresponding relationship and the sidelink channel measurement result;

sending indication information to the first terminal, wherein the indication information is used to indicate the timer length of the target discontinuous reception timer.

The processor 1400 is further configured to read the program and perform the following steps:

obtaining a corresponding relationship among the sidelink channel measurement result, QoS and the timer length of the discontinuous reception timer;

determining the timer length of the target DRX timer according the corresponding relationship, QoS required by a current service and the sidelink channel measurement result, sending indication information to the first terminal, wherein the indication information is used to indicate the timer length of the target DRX timer.

The processor 1400 is further configured to read the program and perform the following steps:

sending the sidelink RRC signaling or the sidelink MAC CE to the first terminal, the sidelink RRC signaling or the sidelink MAC CE is used to indicate the timer length of the target DRX timer.

Wherein, the sidelink RRC signaling or the sidelink MAC CE further includes at least one of the following information: a source layer L2 identifier, a destination L2 identifier, an SLRB identifier, or an LCID.

Optionally, the corresponding relationship is configured by a network side device, or the corresponding relationship is pre-configured in the second terminal.

Optionally, the corresponding relationship is configured by the network side device through dedicated RRC signaling or broadcast RRC signaling.

Optionally, the sidelink channel measurement result includes one or both of channel state information and channel congestion degree;

The channel state information includes one or more of the following information:

CSI, RI, CQI, SINK, RSRP, RSRQ, RSSI, block error rate, bit error rate and SRS;

The channel congestion degree includes one or more of the following information: CBR threshold, CR.

Optionally, the target discontinuous reception timer includes one or more of the following timers:

Onduration timer, Short DRX cycle Timer, Long DRX cycle Timer, Inactivity Timer, RTT Timer, Retransmission Timer.

Embodiments of the present disclosure further provide a computer-readable storage medium, where a computer program is stored on the computer-readable storage medium. When the computer program is executed by a processor, each process of the foregoing information determination method embodiment is implemented, and the same technology can be achieved. The effect, in order to avoid repetition, is not repeated here. The computer-readable storage medium is, for example, a read-only memory (ROM), a random access memory (RAM), a magnetic disk, or an optical disk.

It should be noted that, herein, the terms "comprising", "including" or any other variation thereof are intended to encompass non-exclusive inclusion, such that a process, method, article or device comprising a series of elements includes not only those elements, also includes other elements not expressly listed or inherent to such a process, method, article or apparatus. Without further limitation, an element defined by the phrase "comprising a . . . " does not preclude the presence of additional identical elements in a process, method, article or apparatus that includes the element.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Those of ordinary skill in the art may implement the described functionality using different methods for each particular application, but such implementations should not be considered beyond the scope of this disclosure.

Those skilled in the art can clearly understand that, for the convenience and brevity of description, the specific working process of the above-described systems, devices and units may refer to the corresponding processes in the foregoing method embodiments, which will not be repeated here.

In the embodiments provided in the present disclosure, it should be understood that the disclosed device and method may be implemented in other modes. For example, the device embodiments described above are only illustrative. For example, the division of the units is only a logical function division. In actual implementation, there may be other division methods. For example, multiple units or components may be combined or be integrated into another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this embodiment.

In addition, each functional unit in each embodiment of the present disclosure may be integrated into one processing unit, or each unit may exist physically alone, or two or more units may be integrated into one unit.

From the description of the above embodiments, those skilled in the art can clearly understand that the methods of the above embodiments can be implemented by means of software plus a necessary general hardware platform, and of course hardware can also be used, but in many cases the former is better implementation. According to this understanding, the technical solutions of the present disclosure can be embodied in the form of software products in essence, or the parts that make contributions to related art. The computer software products are stored in a storage medium (such as ROM/RAM, magnetic disk, optical disk), including several instructions to make a terminal (which may be a mobile phone, a computer, a server, an air conditioner, or a network device, etc.) execute the methods described in the various embodiments of the present disclosure.

Those of ordinary skill in the art can understand that all or part of the processes in the methods of the above embodiments can be accomplished by controlling the relevant hardware through a computer program, and the program can be stored in a computer-readable storage medium, and the program may include the processes of the embodiments of the above-mentioned methods. The storage medium may be a magnetic disk, an optical disk, a read-only memory (ROM), or a random access memory (RAM) or the like.

It can be understood that the embodiments described in the present disclosure may be implemented by hardware, software, firmware, middleware, microcode, or a combination thereof. For hardware implementation, modules, units and sub-units can be implemented in one or more Application Specific Integrated Circuits (ASIC), Digital Signal Processor (DSP), Digital Signal Processing Device (DSP Device, DSPD), Programmable Logic Device (PLD), Field-Programmable Gate Array (FPGA), general-purpose processor, controller, microcontroller, microprocessor, in other electronic units or combinations thereof.

For software implementation, the techniques described in the embodiments of the present disclosure may be implemented through modules (e.g., procedures, functions, etc.) that perform the functions described in the embodiments of the present disclosure. Software codes may be stored in memory and executed by a processor. The memory can be implemented in the processor or external to the processor.

The embodiments of the present disclosure have been described above in conjunction with the accompanying drawings, but the present disclosure is not limited to the above-mentioned specific embodiments, which are merely illustrative rather than restrictive. Under the inspiration of the present disclosure, many forms can be made without departing from the scope of the present disclosure and the protection scope of the claims, which all fall within the protection of the present disclosure.

What is claimed is:

1. An information determination method, applied to a first terminal, comprising:

receiving indication information from a second terminal and determining a timer length of a target discontinuous reception (DRX) timer according the indication information from the second terminal; the indication information being used to indicate the timer length of the target DRX timer; wherein the first terminal communicates with the second terminal through a sidelink, wherein the receiving the indication information from the second terminal comprises: receiving a sidelink radio resource control (RRC) signaling from the second terminal, the sidelink RRC signaling being used to indicate the timer length of the target DRX timer, wherein the target DRX timer includes one or more of the following: Onduration timer, Inactivity Timer, or Retransmission Timer, wherein the timer length of the target DRX timer is determined according to a sidelink channel measurement result and according to a corresponding relationship between the sidelink channel measurement result and the timer length of the DRX timer from the network side device; or the timer length of the target DRX timer is determined according to a sidelink channel measurement result, according to a corresponding relationship among the sidelink channel measurement result, quality of service (QoS) and the timer length of the DRX timer from a network side device, and according to QoS required by a current service.

2. The method according to claim 1, wherein before receiving the indication information from the second terminal, the method further comprises:

sending data or a reference signal to the second terminal, the data or the reference signal being used to obtain the sidelink channel measurement result.

3. The method according to claim 1, wherein the sidelink RRC signaling further includes at least one of the following: a source layer L2 identifier, a destination L2 identifier, a sidelink radio barrier (SLRB) identifier, or a logic channel ID (LCID).

4. The method according to claim 1, wherein the corresponding relationship between the sidelink channel measurement result and the timer length of the DRX timer is received from the network side device through a dedicated RRC signaling or a broadcast RRC signaling.

5. The method according to claim 1, wherein the sidelink channel measurement result includes one or more of channel state information and a channel congestion degree;

the channel state information includes one or more of the following:

Channel State Information (CSI), Rand Indication (RI), Channel Quality Indicator (CQI), Signal to Interference plus Noise Ratio (SINR), Reference Signal Receiving Power (RSRP), Reference Signal Receiving Quality (RSRQ), Received Signal Strength Indication (RSSI), Block Error Rate, Bit Error Rate, or Sounding Reference Signal (SRS);

the channel congestion degree includes one or more of the following: a Channel Busy Ratio (CBR) threshold, and a channel occupancy ratio (CR).

6. A communication apparatus, applied to a first terminal, comprising: a transceiver, a memory, a processor, and a program stored in the memory and executable on the processor; wherein the processor is configured to read the program in the memory to perform the information determination method according to claim 1.

7. An information determination method, applied to a second terminal, comprising:

sending indication information to a first terminal, wherein the indication information is used to indicate a timer length of a target discontinuous reception (DRX) timer, wherein the sending indication information to the first terminal comprises: sending a sidelink RRC signaling to the first terminal, wherein the sidelink RRC signaling is used to indicate the timer length of the target DRX timer; wherein the second terminal communicates with the first terminal through a sidelink, wherein the target DRX timer includes one or more of the following: Onduration timer, Inactivity Timer, or Retransmission Timer, wherein the sending indication information to the first terminal comprises: obtaining a corresponding relationship between a sidelink channel measurement result and a timer length of the DRX timer from the network side device, determining the timer length of the target DRX timer according to the corresponding relationship and the sidelink channel measurement result, and sending the indication information to the first terminal, wherein the indication information is used to indicate the timer length of the target DRX timer; or the sending indication information to the first terminal comprises: obtaining a corresponding relationship among the sidelink channel measurement result, QoS and the timer length of the DRX timer from the network side device; determining the timer length of the target DRX timer according the corresponding relationship, according to QoS required by a current service and according to the sidelink channel measurement result; and sending the indication information to the first terminal, wherein the indication information is used to indicate the timer length of the target DRX timer.

8. The method according to claim 7, wherein the corresponding relationship between the sidelink channel measurement result and the timer length of the DRX timer is received from the network side device through a dedicated RRC signaling or a broadcast RRC signaling.

9. The method according to claim 7, wherein the sidelink RRC signaling further includes at least one of the following: a source layer L2 identifier, a destination L2 identifier, a sidelink radio barrier (SLRB) identifier, or a logic channel ID (LCID).

10. The method according to claim 7, wherein the sidelink channel measurement result includes one or both of channel state information and a channel congestion degree;

the channel state information includes one or more of the following:

CSI, RI, CQI, SINR, RSRP, RSRQ, RSSI, block error rate, bit error rate or SRS;

the channel congestion degree includes one or more of the following: a CBR threshold, or a CR.

11. A communication apparatus, applied to a second terminal, comprising: a transceiver, a memory, a processor, and a program stored on the memory and executed by the processor; wherein the processor is configured to read the program in the memory to perform the information determination method according to claim 7.

12. An information determination method, applied to a network side device, comprising:

sending a corresponding relationship between a sidelink channel measurement result and a timer length of a target discontinuous reception (DRX) timer to at least one of a first terminal or a second terminal, so that at least one of the first terminal or the second terminal determines the timer length of the target DRX timer according to the corresponding relationship and the sidelink channel measurement result; or sending a corresponding relationship among the sidelink channel measurement result, QoS and the timer length of the target DRX timer to at least one of the first terminal or the second terminal, so that at least one of the first terminal or the second terminal determines the timer length of the target DRX timer according to the corresponding relationship, QoS required by a current service and the sidelink channel measurement result, wherein the target DRX timer includes one or more of the following: Onduration timer, Inactivity Timer, or Retransmission Timer.

13. The method according to claim 12, wherein the sidelink RRC signaling further includes at least one of the following: a source layer L2 identifier, a destination L2 identifier, a sidelink radio barrier (SLRB) identifier, or a logic channel ID (LCID).

14. A communication apparatus, applied to a network side device, comprising: a transceiver, a memory, a processor, and a program stored in the memory and executed by the processor; wherein the processor is configured to read the program in memory to perform the information determination method according to claim 12.

\* \* \* \* \*